US012332151B2

(12) United States Patent
Berndt et al.

(10) Patent No.: US 12,332,151 B2
(45) Date of Patent: Jun. 17, 2025

(54) NEAR REAL-TIME, HANDS-OFF DETECTION OF AIRBORNE PARTICULATE CONTAMINANTS AND BIOBURDEN

(71) Applicants: Ernst-Ulrich Berndt, Berlin (DE); Lea Ann Ellermeier, Dallas, TX (US); Ruedger Rubbert, Berlin (DE); Justin Bernstein, Dallas, TX (US); Jonathan Berndt, Berlin (DE); Richard William Nesbit, Los Angeles, CA (US)

(72) Inventors: Ernst-Ulrich Berndt, Berlin (DE); Lea Ann Ellermeier, Dallas, TX (US); Ruedger Rubbert, Berlin (DE); Justin Bernstein, Dallas, TX (US); Jonathan Berndt, Berlin (DE); Richard William Nesbit, Los Angeles, CA (US)

(*) Notice: Subject to any disclaimer, the term of this patent is extended or adjusted under 35 U.S.C. 154(b) by 0 days.

(21) Appl. No.: 17/461,937

(22) Filed: Aug. 30, 2021

(65) Prior Publication Data

US 2023/0064876 A1 Mar. 2, 2023

(51) Int. Cl.
*G01N 15/06* (2024.01)
*G01N 1/22* (2006.01)
(Continued)

(52) U.S. Cl.
CPC ......... *G01N 1/2205* (2013.01); *G01N 1/2273* (2013.01); *G01N 1/2813* (2013.01);
(Continued)

(58) Field of Classification Search
CPC . G01N 15/0227; G01N 1/2205; G01N 1/2273
See application file for complete search history.

(56) References Cited

U.S. PATENT DOCUMENTS 5,319,575 A * 6/1994 Lilienfeld .............. G01N 21/53
702/26
5,719,667 A * 2/1998 Miers ................. G01N 15/1436
356/73

(Continued)

OTHER PUBLICATIONS

Huffman et al., Real-time sensing of bioaerosols: Review and current perspectives, Aerosol Science and Technology. Sep. 27, 2019, https://doi.org/10.1080/02786826.2019.1664724.

(Continued)

*Primary Examiner* — Rebecca C Bryant
(74) *Attorney, Agent, or Firm* — Christopher Pilling

(57) ABSTRACT

Various implementations, systems and methods are disclosed for continuous, near real-time, hands-off sampling of airborne particulate matter, and qualification and/or quantification of biomolecules in the sample representative for biologic or microbial contamination. The systems and methods may utilize an electrostatic precipitator for sampling the matter; and a measurement assembly configured to illuminate, excite, or breakdown the sampled matter by electromagnetic radiation, and to detect a spectrum, or one or more wavelength bands of the scatter emitted by the sample. In an exemplary implementation, a sputter deposition process is employed to configure the sample for an enhanced plasmon resonance. The measurement data may be transferred via wireless communication means for cloud storage and signal processing.

18 Claims, 10 Drawing Sheets

(51) Int. Cl.
  *G01N 1/28* (2006.01)
  *G01N 15/0205* (2024.01)
  *G01N 15/1434* (2024.01)
  *G01N 21/94* (2006.01)
  *G01N 15/00* (2006.01)
  *G01N 15/10* (2006.01)
  *G01N 15/14* (2006.01)
  *G01N 21/85* (2006.01)

(52) U.S. Cl.
  CPC ..... *G01N 15/0211* (2013.01); *G01N 15/0637* (2013.01); *G01N 15/0656* (2013.01); *G01N 15/1436* (2013.01); *G01N 21/94* (2013.01); *G01N 2001/2833* (2013.01); *G01N 2015/0046* (2013.01); *G01N 2015/03* (2013.01); *G01N 2015/1029* (2024.01); *G01N 2015/103* (2024.01); *G01N 2015/1493* (2013.01); *G01N 2015/1497* (2013.01); *G01N 2021/8585* (2013.01)

(56) References Cited

U.S. PATENT DOCUMENTS

| | | | |
|---|---|---|---|
| 7,738,100 B2 | 6/2010 | McCawley et al. | |
| 8,398,839 B1 | 4/2013 | Morales et al. | |
| 8,623,976 B2 | 1/2014 | Bolotin et al. | |
| 8,663,909 B2 | 4/2014 | Gazenko | |
| 9,250,162 B2 | 2/2016 | Braden et al. | |
| 10,436,685 B2* | 10/2019 | Cherubini | C12M 47/02 |
| 10,883,873 B1 | 1/2021 | Awadh et al. | |
| 10,919,047 B2 | 2/2021 | Mainelis et al. | |
| 10,920,266 B2 | 2/2021 | Kim et al. | |
| 10,955,352 B2 | 4/2021 | Gong et al. | |
| 10,983,040 B2 | 4/2021 | Pariseau | |
| 11,016,043 B2 | 5/2021 | Henning et al. | |
| 11,016,280 B1 | 5/2021 | Pan et al. | |
| 2015/0355084 A1* | 12/2015 | White | G01N 15/1433 506/35 |
| 2019/0162646 A1 | 5/2019 | Silcott | |

OTHER PUBLICATIONS

Fronczek et al., Biosensors for Monitoring Airborne Pathogens, Journal of Laboratory Automation, 2015, vol. 20(4) 390-410.

Bioflash Biological Identifier, Rapid, Biological Aerosol Collection & Identification System, Smiths detection, Jan. 10, 2020, Baltimore, MD.

Battelle, REBS+ Bioidentification System, 2021, www.battelle.org.

* cited by examiner

NEAR REAL-TIME, HANDS-OFF DETECTION OF AIRBORNE PARTICULATE CONTAMINANTS AND BIOBURDEN

FIELD OF THE INVENTION

The present invention relates in the field of hygiene and air quality monitoring to the near real-time, hands-off detection of airborne particulate contaminants and/or bioburden.

BACKGROUND

Pathogens whether airborne, waterborne, or present on fomites or surfaces are a risk to occupants in public and private spaces. The recent COVID-19 pandemic underscored the necessity to pay attention to respiratory transmissions of airborne pathogens. Particulates are commonly understood including small solid particles, and liquid droplets, colloids, and aerosols, ranging in scale from few nanometers to fractions of millimeters. Particulates of various matter are recognized as pollutants. Bacterial cells are typically 0.5 micrometers to 5 micrometers in length. Viruses typically range in size from 0.02 micrometers to 0.25 micrometers. While bigger particles tend to fall down and land on the ground or on surfaces, smaller particles remain in the air for a longer time. Liquid particles may dry out and become smaller and finally dry. The numbers of particles in the atmosphere varies from several hundreds to more than hundred thousand per cubic centimeter. Particulates have large surface areas to attract for example organic matter. Particulates consist of or may carry biologic or microbial products.

Good air quality may be defined as the absence of harmful concentrations of toxic gases, and particulate contaminants, including pathogens.

Current methods to detect airborne biologic and microbial contaminants or pathogens include passive and active air sampling. In the passive method, standard Petri dishes containing a culture media are placed in an environment to be monitored, so that airborne particles sediment out of the air and settle onto the culture media's surface over the time of exposure. Active air samplers provide a flow of air that is directed onto the surface of a culture media of such Petri dish, so that the particles in the air to be impinged or impacted onto the culture media's surface. In either method, a laboratory procedure follows, where the dishes are incubated to allow viable biological particles collected on the surface to develop visible colonies to be counted. The number of colony forming units (CFUs) represents a quantitative analysis of living airborne microorganisms to reveal the amount and trends in airborne contamination. The culture media typically supports the growth of any bacteria and fungi but can be configured to grow predominantly certain types. Incubation periods may take up to 7 days for the detection of yeasts and molds. In an alternative active method, an air volume is directed, for example, to form a cyclonic airflow mixed with a liquid so that airborne particles are washed out of the air and be collected in a liquid. A vial of the liquid that contains the microbial contamination is then subjected to standard laboratory microbiological analysis methods. These analytic techniques may include, for example, and adenosine triphosphate (ATP) tests and polymerase chain reaction (PCR) analytics. ATP is a molecule found in and around living cells. The test typically breaks up the cell walls, by adding a lytic reagent, to expose the ATP in the cells. The ATP is then quantified by measuring the light produced through its reaction with a second chemical reagent, for example, the enzyme luciferase using a luminometer. The amount of light produced, measured in relative light units (RLUs), is proportional to the amount of ATP present in the liquid sample and is provided as a measure of the biological concentration in the air volume subjected to sampling. The PCR method makes millions of complete or partial copies of a specific deoxyribonucleic acid (DNA) or a specific ribonucleic acid (RNA) sample to thereby amplify the DNA or RNA response for spectroscopic analysis. The analysis may qualify a specific airborne virus contamination and quantify its concentration.

All described options and methodologies are deficient or limited in their respective scope.

SUMMARY

Technical Problem

Monitoring artificial environments such as clean rooms may allow the count of single particles, and manufacturing processes of medical devices, for example, may accommodate lead-times of several days as feed-back cycles to detect biologic contamination and related trends. However, real-word environments have a particle concentration that may overflow the instrumentation to detect and identify single particles with respect to its biological content. Further, risk management of public and private indoor environments may require a near real-time risk mitigation that may not accommodate an involvement of laboratory technicians and lengthy off-site laboratory procedures.

There has not been recognition of methods and systems in the field of hygiene and air quality monitoring, until now by the inventors, of the need to enable a continuous hands-off monitoring of airborne bioburden by actively collecting a plurality or a bulk of airborne particulate matter and detecting in near real-time the biological and microbial content in the collected sample in hundreds of detection cycles over several weeks without operator interaction in an automatic mode.

Solution to Problem and Advantageous Effects of Invention

The objective of the present invention is to provide a solution for near real-time, hands-off detection of airborne particulate contaminants and/or bioburden.

The system(s) and method(s) provided by the various embodiments of the present invention comprise several independent inventive features providing substantial improvements. The greatest benefit will be achieved in the field of hygiene and air quality monitoring, and more particularly in the field of sampling airborne particulate matter for qualification and quantification of contaminants and/or of its biologic and microbial content.

In or more exemplary embodiments of the present invention, a stand-alone system is disclosed. The system is configured to perform a method for the on-site detection of airborne contaminants comprising the steps: (a) sampling a plurality of airborne particulate matter from an air flow to thereby obtain a specimen of coherent or condensed matter over a first period of time to thereby define a sampling time; (b) detecting at least one non-gaseous material comprised in the specimen; (c) receiving a signal from a sensor system employed in step (b); and (d) transforming the signal into electronic data in a format for display or transmission by a communications interface. The specimen is obtained adjacent a substrate. The steps are performed without an operator interaction to thereby define a hands-off, near real-time detection cycle. The detection cycle is performed over a second period of time to thereby define a cycle time, not to exceed 1 hour. The step (a) is performed without adding a liquid for sampling. The step (b) is performed without adding a liquid for detection. The step (b) utilizes an excitement process of a plasmon resonance of at least a portion of the coherent or condensed matter. The step (b) further utilizes a detection process of an enhanced plasmon resonance of at least a portion of the coherent or condensed matter. The excitement process employs a laser source to excite molecules comprised in the specimen. The step (b) utilizes a spectroscopic optical sensor system configured to decompose or split the electromagnetic radiation scatter received from the excitement of the specimen into its constituent bands of wavelength or spectrum. A filter is used to block the band of wavelength generated by the laser from the spectroscopic optical sensor system. The sensor system comprises a linear charge-coupled device (CCD) chip. The spectroscopic optical sensor system is configured that the charge of each CCD element represents the intensity of a different band of wavelength of the electromagnetic radiation scatter received. A Peltier element is used to cool the CCD chip to increase the noise/signal ratio of the read-out signal of the CCD chip. Step (b) further utilizes a laser excitement process directing a laser beam towards the specimen. Step (b) detects an intrinsic fluorescence or photoluminescence of the specimen, and a Raman scatter spectrum of the enhanced plasmon resonance. After the laser excitement process is cut off, a decrease and/or a lifetime of the intrinsic fluorescence or photoluminescence of the specimen is measured. The electronic data representing those detections and measurements are transmitted via fifth-generation wireless (5G) cellular technology to a cloud data storage and data computing system for statistical analysis, calibration, trend analysis and comparison against databases of like detection and measurement data, to generate information about the probability of presence of certain non-gaseous biologic and/or non-biologic contaminants in the specimen and each corresponding amount present in the specimen. At the end of the overall detection cycle, the substrate is decontaminated, cleaned, and recycled to perform a plurality of detection cycles. The detection cycle is performed iteratively multiple times without an operator interaction to thereby define an automatic mode.

In one or more exemplary embodiments of the present invention, a method for the detection of airborne contaminants comprising the steps: (a) sampling a plurality of airborne particulate matter from an air flow to thereby obtain a specimen of coherent or condensed matter over a first period of time to thereby define a sampling time; (b) detecting at least one non-gaseous material comprised in the specimen; (c) receiving a first signal from a sensor system employed in step (b); and (d) transforming the first signal into electronic data in a format for display or transmission by a communications interface. The steps may be performed at least partially sequential, in any order, each step is performed at least one time, and without an operator interaction to thereby define a hands-off, near real-time detection cycle. The detection cycle may be performed over a second period of time to thereby define a cycle time. The step (a) may be performed without adding a liquid for sampling. The step (b) may be performed without adding a liquid for detection. The step (b) may utilize an excitement process of a plasmon resonance of at least a portion of the coherent or condensed matter. The step (b) may further utilize a detection process of an enhanced plasmon resonance of at least a portion of the coherent or condensed matter. The cycle time may not exceed 1 hour. The method may further comprise (e1) generating the air flow. The method may further comprise (e2) employing a cyclonic separation process configured to sort particles. The method may further comprise (e3) counting airborne particles in the air flow. The method may further comprise (e4) determining the sampling time responsive to a second signal derived from a step counting particles. The method may further comprise (e5) exposing the specimen to a nanoscale surface structure to thereby enhance a plasmon resonance. The method may further comprise (e6) exposing the specimen to solid nanoscale or microscale particles to thereby enhance a plasmon resonance. The method may further comprise (e7) exposing the specimen to colloids to thereby enhance a plasmon resonance. The method may further comprise (e8) exposing the specimen to an electromagnetic radiation to thereby detect the non-gaseous material. The method may further comprise (e9) exposing the specimen to an electrostatic field to thereby detect the non-gaseous material. The method may further comprise (e10) exposing the specimen to a magnetic field to thereby detect the non-gaseous material. The method may further comprise (e11) detecting an electromagnetic scatter emitted by at least one molecule comprised in the specimen. The method may further comprise (e12) detecting a magnetic or electromagnetic resonance of at least portions of the specimen. The method may further comprise (e13) detecting a cavity ring-down laser absorption spectrum. The method may further comprise (e14) calibrating a detection system. The method may further comprise (e15) calibrating a sensor system. The method may further comprise (e16) cooling a sensor system. The method may further comprise (e17) heating the specimen. The method may further comprise (e18) exposing the specimen to a vacuum. The method may further comprise (e19) evaporating at least portions of the specimen. The method may further comprise (e20) annihilating at least portions of the specimen. The specimen of coherent or condensed matter may be obtained adjacent a substrate. The method may further comprise (f1) filtering an air volume. The method may further comprise (f2) recycling the substrate. The method may further comprise (f3) replacing the substrate. The method may further comprise (f4) providing a plurality of the substrate from a coil. The method may further comprise (f5) winding up a plurality of the substrate to form a coil. The method may further comprise (f6) replacing a coil comprising of a plurality of substrate. The method may further comprise (f7) discarding a coil comprising a plurality of substrates. The method may further comprise (f8) cleaning the substrate. The method may further comprise (f) recycling the substrate and utilizing the recycled substrate performing a plurality of the detection cycle. The method may further comprise (f10) recycling the substrate utilizing a rotary indexing table. The method may further comprise (b1) sensing at least one phenomenon of physics. The phenomenon of physics may comprise an image. The phenomenon of physics may comprise a microscopic image. The phenomenon of physics may comprise an absorption spectrum. The phenomenon of physics may comprise an emission spectrum. The phenomenon of physics may comprise an information of a particle size. The phenomenon of physics may comprise an information of a particle shape. The phenomenon of physics may comprise a Raman scattering. The phenomenon of physics may comprise a Rayleigh scattering. The phenomenon of physics may comprise a Mie scattering. The phenomenon of physics may comprise a Tyndall scattering. The phenomenon of physics may comprise a mass spectrum. The phenomenon of physics may comprise a nuclear magnetic resonance spectrum. The phenomenon of physics may comprise a cavity ring-down laser absorption spectrum. The phenomenon of physics may comprise a laser-induced breakdown emission. The phenomenon of physics may comprise a spark-induced breakdown emission. The phenomenon of physics may comprise a thermal emission. The phenomenon of physics may comprise an intrinsic photoluminescence. The phenomenon of physics may comprise a photoluminescence of a marker reagent. The phenomenon of physics may comprise a chromogenic effect. The phenomenon of physics may comprise a rovibrational transition of molecules in the infrared spectrum. The phenomenon of physics may comprise a plasmon resonance. The phenomenon of physics may comprise an enhanced plasmon resonance. The phenomenon of physics may comprise a clustered regularly interspaced short palindromic repeats (CRISPR) mediated surface-enhanced Raman scattering (SERS). The phenomenon of physics may comprise a fluorescence lifetime. The phenomenon of physics may comprise a multiphoton excited fluorescence. The phenomenon of physics may comprise emission anisotropy. The phenomenon of physics may comprise a change in polarization. One or more of the steps described in this paragraph may be combined in any combination and in no or in any order. One or more of the steps described in this paragraph may be further combined with one or more of the features and/or objects disclosed in this, the preceding and/or the following paragraphs in any combination and in no or in any order.

In one or more exemplary embodiment of the present invention, a system for the detection of airborne contaminants is disclosed, the system comprising a first assembly configured to sample a plurality of airborne particulate matter from an air flow to thereby obtain a specimen of coherent or condensed matter; a second assembly configured to detect at least one distinctive feature of at least one non-gaseous material comprised in the specimen; wherein the second assembly comprises a sensor system; an electronic converter configured to transform a first signal received from the sensor system into electronic data in a format for display or transmission by a communications interface; and a control unit configured to perform a plurality of process steps at least partially sequential, in any order, each process step is performed at least one time, and without an operator interaction to thereby define a hands-off, near real-time detection cycle. The plurality of process steps may comprise: (a) sampling the plurality of airborne particulate matter, (b) detecting the at least one distinctive feature, and (c) transforming the first signal received from the sensor system into the electronic data. The control unit may be further configured to perform the process step (a) over a first period of time to thereby define a sampling time. The control unit may be further configured to perform the detection cycle over a second period of time to thereby define a cycle time. The control unit may comprise a processor, and a non-transitory storage medium readable by the processor. The non-transitory storage medium may have stored thereon a set of instructions. The set of instructions when executed by the processor may cause the control unit to perform the plurality of process steps at least partially sequential, in any order, and each process step is performed at least one time as the set of instructions determines. The control unit may be further configured to perform a plurality of the detection cycles sequentially without an operator interaction. The cycle time may not exceed 1 hour. The system may be configured to operate as a stand-alone device. The at least one distinctive feature of the at least one non-gaseous material may comprise an intensity of a nuclear magnetic resonance band. The at least one distinctive feature may comprise a spectrum and an intensity profile of a plurality of Raman scattered photons. The at least one distinctive feature may comprise an intensity profile of a nuclear magnetic resonance spectrum. The at least one distinctive feature may comprise an intensity of a plasmon resonance band. The at least one distinctive feature may comprise an intensity profile of a plasmon resonance spectrum. The at least one distinctive feature may comprise an intensity of an emission band. The at least one distinctive feature may comprise an intensity profile of an emission spectrum. The at least one distinctive feature may comprise an intensity of an absorption band. The at least one distinctive feature may comprise an intensity profile of an absorption spectrum. The at least one distinctive feature may comprise a macroscopic image. The at least one distinctive feature may comprise a microscopic image. The at least one distinctive feature may comprise an intensity of a mass-to-charge ratio interval or band. The at least one distinctive feature may comprise a polarization of an emission band. The at least one distinctive feature may comprise a polarization profile of an emission spectrum. The at least one distinctive feature may comprise a laser resonance lifetime decrease. The at least one distinctive feature may comprise an emission lifetime. The at least one distinctive feature may comprise a lifetime profile of an emission spectrum. The at least one distinctive feature may comprise an anisotropy of an emission scatter. The at least one distinctive feature may comprise an anisotropy profile of an emission spectrum. The at least one distinctive feature may comprise an intensity of an alpha radiation. The at least one distinctive feature may comprise an intensity of a beta radiation. The at least one distinctive feature may comprise an intensity of a gamma radiation. The at least one distinctive feature may comprise an intensity profile of a mass-to-charge spectrum or histogram. The second assembly may be configured to detect the at least one distinctive feature of at least one non-gaseous material to thereby determine at least one information. The at least one information may comprise an identity of the at least one non-gaseous material. The at least one information may comprise a probability of an identity of the at least one non-gaseous material. The at least one information may comprise a ratio profile of a plurality of constituent atomic content of the at least one non-gaseous material. The at least one information may comprise a profile of a plurality of constituent molecular bonds of the at least one non-gaseous material. The at least one information may comprise a classifying indication of the at least one non-gaseous material a probability of a classifying identity of the at least one non-gaseous material. The at least one information may comprise an amount of the at least one non-gaseous material. The at least one information may comprise an amount of a class of the at least one non-gaseous material. The at least one information may comprise a differentiation between at least two of the non-gaseous materials. The second assembly may further comprise a source configured to emit a first electromagnetic radiation to excite or breakdown a first plurality of molecules comprised in the specimen. The sensor system may be configured to detect a second electromagnetic radiation of scatter emitted by a second plurality of molecules comprised in the specimen. The first electromagnetic radiation may comprise at least one band of wavelength or a spectrum in the wavelength range between 10 nanometer and 1 millimeter. The second electromagnetic radiation may comprise at least one band of wavelength or a spectrum in the wavelength range between 10 nanometer and 1 millimeter. The second assembly may further comprise at least one optical element configured to decompose the second electromagnetic radiation to receive at least one band or a continuum of its constituent wavelengths. The sensor system may utilize at least one electronic effect. The electronic effect may comprise a charge-coupled effect. The electronic effect may comprise a photon-multiplying effect. The electronic effect may comprise an internal photoelectric effect. The electronic effect may comprise an external photoelectric effect. The electronic effect may comprise a photo-transistor effect. The electronic effect may comprise a photo-diode effect. The electronic effect may comprise a photo-resistor effect. The electronic effect may comprise a photon-triggered electronic avalanche effect. The first assembly may comprise a precipitator configured to utilize forces of an electrostatic or electromagnetic field to sample the plurality of airborne particulate matter. The first assembly may comprise a particle counter configured to count particles comprised in the plurality of airborne particulate matter. The plurality of process steps may further comprise: (d) counting particles. The control unit may be further configured to determine the sampling time responsive to a second signal derived from the process step (d). The first assembly may further comprise a plasma etching unit configured to annihilate or evaporate at least partially the specimen. The plurality of process steps may further comprise: (e) annihilating or evaporating at least partially the specimen. The first assembly may be further configured to sample the plurality of airborne particulate matter from the air flow to thereby obtain the specimen of coherent or condensed matter adjacent a substrate. The first assembly may further comprise a handling unit configured to replace or recycle the substrate. The plurality of process steps may further comprise: (f) replacing or recycling the substrate. The substrate may be configured to enhance a plasmon resonance involving molecules of the specimen to thereby enhance the yield rate of Raman scattered photons emitted by at least one molecule comprised in the specimen. The substrate may comprise at least one enhancement structure. The at least one enhancement structure may comprise a nanotube or a microscale tube. The at least one enhancement structure may comprise a nanotip or a microscale tip. The at least one enhancement structure may comprise a nanoscale or microscale island. The at least one enhancement structure may comprise a nanoscale or microscale pillar. The at least one enhancement structure may comprise an antibody sequence. The at least one enhancement structure may comprise a nanoscale or microscale tag. The at least one enhancement structure may comprise a rough surface. The at least one enhancement structure may comprise a nanoscale or microscale particle. The at least one enhancement structure may comprise a colloid. The at least one enhancement structure may comprise a reflective surface. The at least one enhancement structure may comprise a thin film. The at least one enhancement structure may comprise a microfluidic component. The at least one enhancement structure may comprise an array of nanoscale structures. The at least one enhancement structure may comprise a nanoscale assay. The first assembly may further comprise a first supply unit configured to disburse at least one material. The at least one material may comprise particles. The at least one material may comprise colloids. The at least one material may comprise a chemical reagent. The at least one material may comprise magnetic tags. The at least one material may comprise aerosols. The at least one material may comprise a biomarker. The at least one material may comprise an ion marker. The at least one material may comprise a CRISPR/Cas mediator. The at least one material may be configured to adhere to the coherent or condensed matter. The first supply unit may comprise at least one structural element. The at least one structural element may comprise at least one electrode. The at least one structural element may comprise a spark plug. The at least one structural element may comprise an ink-jet-type mechanism. The at least one structural element may comprise an aerosolizing mechanism. The at least one structural element may comprise a depositing unit employing a deposition method for particles. The at least one structural element may comprise a depositing unit employing a deposition method for colloids. The at least one structural element may comprise a sputter unit employing a sputter deposition process. The at least one structural element may comprise a deposition unit employing a deposition method for fluids. The at least one structural element may comprise an ink-jet-type cartridge. The at least one structural element may comprise an ignition system. The at least one structural element may comprise a rotation mechanism for an electrode. The at least one structural element may comprise a heating mechanism for an electrode. The at least one structural element may comprise a replacement mechanism for an electrode. The first assembly may further comprise a second supply unit configured to create solid nanoscale or microscale particles. The solid nanoscale or microscale particles may comprise a noble metal. The second assembly may be further configured to sense at least one phenomenon of physics. The at least one phenomenon of physics may comprise a macroscopic image. The at least one phenomenon of physics may comprise a microscopic image. The at least one phenomenon of physics may comprise an absorption spectrum. The at least one phenomenon of physics may comprise an emission spectrum. The at least one phenomenon of physics may comprise an information of a particle size. The at least one phenomenon of physics may comprise an information of a particle shape. The at least one phenomenon of physics may comprise a Raman scattering. The at least one phenomenon of physics may comprise a Rayleigh scattering. The at least one phenomenon of physics may comprise a Mie scattering. The phenomenon of physics may comprise a comprise a Tyndall scattering. The at least one phenomenon of physics may comprise a mass spectrum or histogram. The at least one phenomenon of physics may comprise a nuclear magnetic resonance spectrum. The at least one phenomenon of physics may comprise a cavity ring-down laser absorption spectrum. The at least one phenomenon of physics may comprise a laser-induced breakdown emission. The at least one phenomenon of physics may comprise a spark-induced breakdown emission. The at least one phenomenon of physics may comprise a thermal emission. The at least one phenomenon of physics may comprise an intrinsic photoluminescence. The at least one phenomenon of physics may comprise a photoluminescence of a marker reagent. The at least one phenomenon of physics may comprise a photoluminescence of LIVE/DEAD marker. The at least one phenomenon of physics may comprise a chromogenic effect. The at least one phenomenon of physics may comprise a rovibrational transition of molecules in the infrared spectrum. The at least one phenomenon of physics may comprise a plasmon resonance. The at least one phenomenon of physics may comprise an enhanced plasmon resonance. The phenomenon of physics may comprise a clustered regularly interspaced short palindromic repeats (CRISPR) mediated surface-enhanced Raman scattering (SERS). The at least one phenomenon of physics may comprise a fluorescence lifetime. The at least one phenomenon of physics may comprise a multiphoton excited fluorescence. The at least one phenomenon of physics may comprise an emission anisotropy. The at least one phenomenon of physics may comprise a change in polarization. The at least one non-gaseous material may comprise at least one biological material or portions thereof. The second assembly may be configured to detect the at least one distinctive feature of the at least one biological material. The at least one biological material may comprise a living microorganism. The at least one biological material may comprise a non-living microbial compound. The at least one biological material may comprise a cell. The at least one biological material may comprise a bacterium. The at least one biological material may comprise a virus. The at least one biological material may comprise a fungi. The at least one biological material may comprise a protist. The at least one biological material may comprise a protozoa. The at least one biological material may comprise an archaea. The at least one biological material may comprise a parasite. The at least one biological material may comprise a prion. The at least one biological material may comprise a gene. The at least one biological material may comprise a genome. The at least one biological material may comprise a deoxyribonucleic acid (DNA). The at least one biological material may comprise a ribonucleic acid (RNA). The at least one biological material may comprise a microbial metabolic substance. The at least one biological material may comprise an adenosine triphosphate (ATP). The at least one biological material may comprise a nicotinamide adenine dinucleotide (NAD). The at least one biological material may comprise a nicotinamide adenine dinucleotide in oxidized form (NAD+). The at least one biological material may comprise a nicotinamide adenine dinucleotide in reduced form (NADH). The at least one biological material may comprise a short chain fatty acid (SCFA). The at least one biological material may comprise a Riboflavin. The at least one biological material may comprise a dipicolinic acid. The at least one biological material may comprise a protein. The at least one biological material may comprise an amino sequence. The at least one biological material may comprise an antibody. The first assembly and/or the second assembly may be further configured to detect the at least one distinctive feature of the at least one non-gaseous material without a certain laboratory process to thereby define a certain laboratory process not being utilized. The certain laboratory process not being utilized may comprise cell growth. The certain laboratory process not being utilized may comprise incubation. The certain laboratory process not being utilized may comprise cell lysis. The certain laboratory process not being utilized may comprise adding a liquid for sampling. The certain laboratory process not being utilized may comprise adding a liquid for detection. The certain laboratory process not being utilized may comprise a polymerase chain reaction (PCR). The certain laboratory process not being utilized may comprise a nucleic acid amplification process. The first assembly and/or the second assembly may be further configured to detect the at least one distinctive feature of the at least one non-gaseous material with a certain laboratory process to thereby define a certain laboratory process being utilized. The certain laboratory process being utilized may comprise cell growth. The certain laboratory process being utilized may comprise incubation. The certain laboratory process being utilized may comprise cell lysis. The certain laboratory process being utilized may comprise adding a liquid for sampling. The certain laboratory process being utilized may comprise adding a liquid for detection. The certain laboratory process being utilized may comprise a polymerase chain reaction (PCR). The certain laboratory process being utilized may comprise a nucleic acid amplification process. The second assembly may comprise at least one of the following: a prism, a diffraction grating, a collimator, an object lens, an focusing mirror, a Peltier element, an optical slit or slit diaphragm, an avalanche diode, a photo diode, a laser, an LED, a lamp, a laser diode, a photon multiplier tube, a charge-coupled device (CCD) array, a CCD line sensor, a photo diode array, a photo-sensitive element, an absorptive filter, an interference filter, a dichroic filter, a dichroic reflector, a bandpass filter/reflector, a short-pass filter/reflector, a long-pass filter/reflector, a beam blocker, a filter configured to block the first electromagnetic radiation, a filter/reflector transmitting more than one band of wavelength, an absorptive polarizer, a Fresnel polarizer, a birefringent polarizer, a thin film polarizer, a wire-grid polarizer, and/or the like. One or more of the objects and/or features described in this paragraph may be combined in any combination and in no or in any order. One or more of the objects described in this paragraph may be configured to carry out one or more of the method steps disclosed in the preceding paragraphs in any combination and in no or in any order. The objects and/or features described in this paragraph may be further combined with one or more of the objects and/or features of the preceding paragraphs and/or of the following paragraphs in any combination and in no or in any order.

The details of one or more embodiments and/or implementations according to the present invention are set forth in the accompanying drawings and the description below. Other features, objects, and advantages of the implementations will be apparent from the description and drawings.

BRIEF DESCRIPTION OF THE DRAWINGS

So that the manner in which the features, advantages, and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only certain embodiments of the invention and are therefore not to be considered limiting of its scope as the invention may admit to other equally effective embodiments.

FIG. 1 is a schematic explanatory view illustrating an exemplary embodiment of a system for the detection of airborne contaminants, in accordance with one or more embodiments of the present invention.

FIG. 2 is a schematic explanatory view illustrating another exemplary embodiment of a system for the detection of airborne contaminants, in accordance with one or more embodiments of the present invention.

FIG. 3 is a schematic explanatory view illustrating an exemplary embodiment of a method and an electrostatic precipitator, in accordance with one or more embodiments of the present invention.

FIG. 4 is a schematic explanatory view illustrating an exemplary embodiment of a method and a generator to supply airborne nanoscale particles, in accordance with one or more embodiments of the present invention.

FIG. 5 is a schematic explanatory view illustrating an exemplary embodiment of a method to mix airborne particulate matter with airborne nanoscale particles, in accordance with one or more embodiments of the present invention.

FIG. 6 is a schematic explanatory view illustrating an exemplary embodiment of a method and a plasma cleaning unit, in accordance with one or more embodiments of the present invention.

Figure 1:
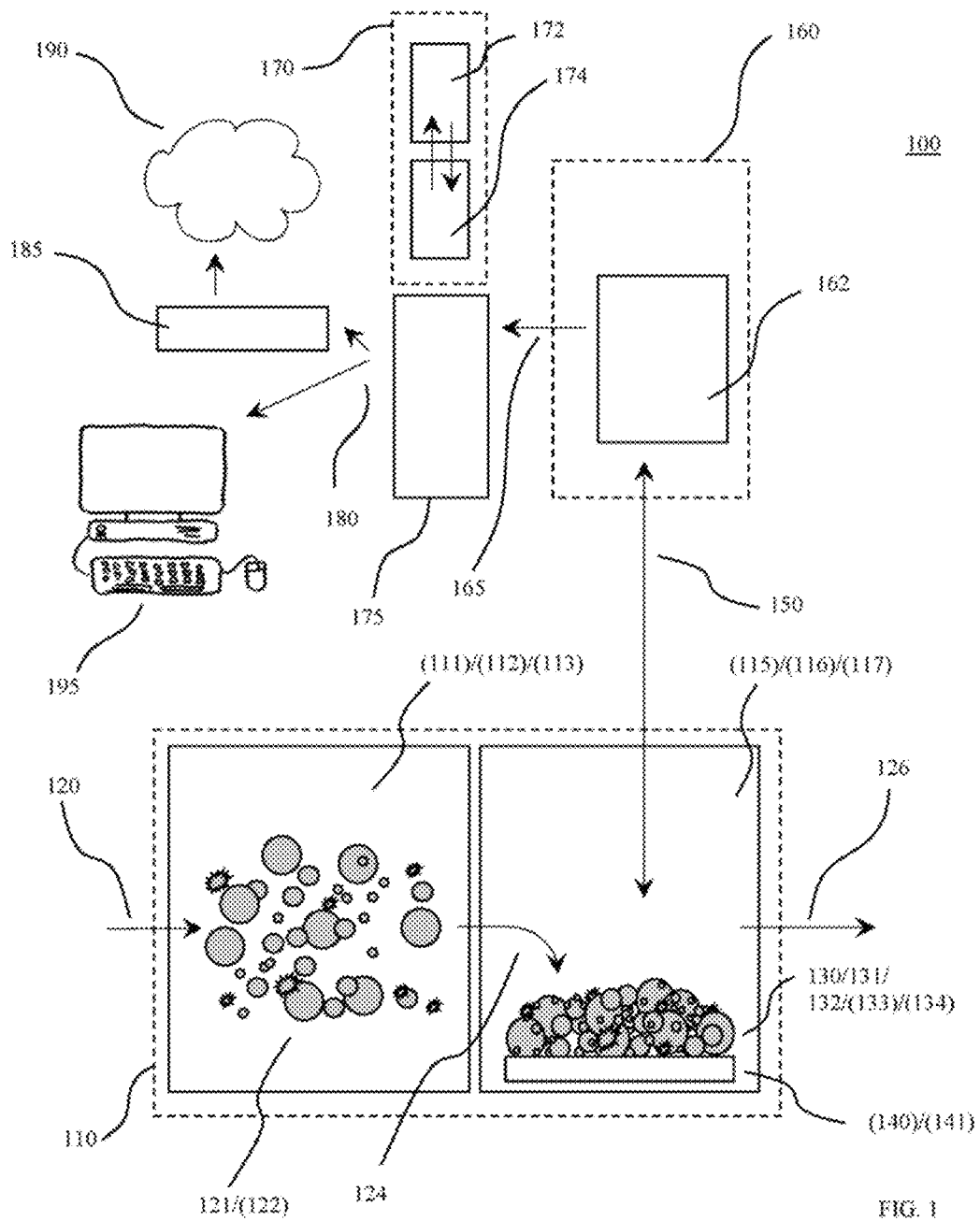

It should be noted that the first digit of a three-number numeral representing an element in the drawings refers to the number of the respective figures FIG. 1 to FIG. 9. It should be noted that the first two digits of a four-number numeral representing an element in the drawings refer to the number of the respective figures FIG. 10. Element with numerals indicated in the drawings in parentheses (i.e. round brackets) may be optional, as the context suggests.

DETAILED DESCRIPTION

The present invention will now be described more fully hereinafter with reference to the accompanying drawings, which illustrate embodiments of the present invention. This invention may, however, be embodied in many different forms and should not be construed as limited to the illustrated embodiments set forth herein. Rather, these embodiments are provided so that this disclosure will be thorough and complete, and will fully convey the scope of the present invention to those skilled in the art. Like numbers refer to like elements throughout. The different numbering of identical or similar components and/or prime notation, if used, indicates similar elements in alternative embodiments and/or configurations.

Throughout this specification the term "matter" shall be understood herein as being generic to all possible meanings supported by the specification and by the word itself; the meaning shall, however, include, without limiting the foregoing and unless the context requires otherwise, the term "material" and/or the term "substance", and vice versa.

Throughout this specification the term "particulates" shall be understood herein as being generic to all possible meanings supported by the specification and by the word itself; the meaning shall, however, include, without limiting the foregoing and unless the context requires otherwise, the term "particles", and vice versa.

Throughout this specification the term "coherent" shall be understood herein as being generic to all possible meanings supported by the specification and by the word itself; the meaning shall, however, include, without limiting the foregoing and unless the context requires otherwise, something that is forming or has been formed as a whole.

Throughout this specification the term "coherent matter" shall be understood herein as being generic to all possible meanings supported by the specification and by the word itself; the meaning shall, however, include, without limiting the foregoing and unless the context requires otherwise, a conglomerate of solid particles, colloids and/or aerosols, or a liquid suspension comprising solid particles, colloids and/or aerosols.

Throughout this specification the term "specimen" shall be understood herein as being generic to all possible meanings supported by the specification and by the word itself; the meaning shall, however, include, without limiting the foregoing and unless the context requires otherwise, the term "sample", and vice versa.

Throughout this specification the term "bioburden" shall be understood herein as being generic to all possible meanings supported by the specification and by the word itself; the meaning shall, however, include, without limiting the foregoing and unless the context requires otherwise, one or more of the following, or portions thereof: microorganisms, metabolic substances produced by microorganisms, any biologic material, any microbial material, and the like.

Throughout this specification the term "biologic" shall be understood herein as being generic to all possible meanings supported by the specification and by the word itself; the meaning shall, however, include, without limiting the foregoing and unless the context requires otherwise, the term "microbial", and vice versa.

Throughout this specification the term "detection of a bioburden" shall be understood herein as being generic to all possible meanings supported by the specification and by the word itself; the meaning shall, however, include, without limiting the foregoing and unless the context requires otherwise, the detection of any matter whatsoever that is representative for biological contamination, or that indicates the presence of microorganisms or its genomes, including, without limiting the foregoing, one or more of the following, or portions thereof: a living microorganism, a non-living microbial compound, a cell, a bacterium, a virus, a fungi, a protist, a protozoa, an archaea, a parasite, a prion, a gene, a genome, a deoxyribonucleic acid (DNA), a ribonucleic acid (RNA), a microbial metabolic substance, an adenosine triphosphate (ATP), a nicotinamide adenine dinucleotide (NAD), a nicotinamide adenine dinucleotide in oxidized form (NAD+), a nicotinamide adenine dinucleotide in reduced form (NADH), a short chain fatty acid (SCFA), a Riboflavin, a dipicolinic acid, a protein, an amino sequence, an antibody, and the like.

Throughout this specification the term "airborne" shall be understood herein as being generic to all possible meanings supported by the specification and by the word itself; the meaning shall, however, include, without limiting the foregoing and unless the context requires otherwise, being in the air.

Throughout this specification the term "near real-time" detection and/or analysis of specimen shall be understood herein as being generic to all possible meanings supported by the specification and by the wording itself; the meaning shall, however, include, without limiting the foregoing and unless the context requires otherwise, that specimens collected on-site in an environment are not compiled and then subjected to a detection and/or analytic batch processing in a laboratory.

Throughout this specification the term "hands-off" shall be understood herein as being generic to all possible meanings supported by the specification and by the word itself; the meaning shall, however, include, without limiting the foregoing and unless the context requires otherwise, not involving or requiring direct involvement and/or intervention to operate or assist a detection cycle.

Throughout this specification the term "aerosol" shall be understood herein as being generic to all possible meanings supported by the specification and by the word itself; the meaning shall, however, include, without limiting the foregoing and unless the context requires otherwise, a suspension of nanoscale solid particles or nanoscale liquid droplets in air or another gas.

Throughout this specification the term "nanoscale" object shall be understood herein as being generic to all possible meanings supported by the specification and by the word itself; the meaning shall, however, include, without limiting the foregoing and unless the context requires otherwise, a size of an object having a main dimension (for example, a diameter) ranging from 1 nanometer to 100 micrometer.

Throughout this specification the term "to perform a process step or a plurality of process steps 'over' a certain period of time" shall be understood herein as being generic to all possible meanings supported by the specification and by the wording itself; the meaning shall, however, include, without limiting the foregoing and unless the context requires otherwise, to perform a process step or a plurality of process steps 'for' a certain period of time, and vice versa.

Throughout this specification the term "an optical element configured to 'decompose' a radiation" shall be understood herein as being generic to all possible meanings supported by the specification and by the wording itself; the meaning shall, however, include, without limiting the foregoing and unless the context requires otherwise, an optical element configured to 'split' a radiation into its constituent bands or continuum(s) of wavelengths, or to filter a constituent band of wavelength, a constituent plurality of bands or at least a constituent spectrum of wavelengths from a radiation.

Throughout this specification the term "phenomenon of physics" shall be understood herein as being generic to all possible meanings supported by the specification and by the words itself; the meaning shall, however, include, without limiting the foregoing and unless the context requires otherwise, any appearance observed or perceived by sensory experience. The term "sensory experience" may include the experience by human senses and/or sensory signals generated by a sensor or detection system and/or the like.

Throughout this specification the term "distinctive feature" shall be understood herein as being generic to all possible meanings supported by the specification and by the words itself; the meaning shall, however, include, without limiting the foregoing and unless the context requires otherwise, marking or identifying a structure, form, or appearance as separate, distinguished, or different.

Throughout this specification the term "supply unit" shall be understood herein as being generic to all possible meanings supported by the specification and by the words itself; the meaning shall, however, include, without limiting the foregoing and unless the context requires otherwise, a part, piece, or complex of an apparatus serving to make something available.

Throughout this specification the term "band" shall be understood herein as being generic to all possible meanings supported by the specification and by the words itself; the meaning shall, however, include, without limiting the foregoing and unless the context requires otherwise, an interval in the frequency domain, delimited by a lower frequency and an upper frequency of a continuum or a spectrum.

FIG. 1 is a schematic explanatory view illustrating an exemplary embodiment of a system 100 for the detection of airborne contaminants, in accordance with one or more embodiments of the present invention.

In one or more exemplary embodiments of the present invention, the system 100 comprises a first assembly 110 configured to sample a plurality of airborne particulate matter 121 from an air flow 120 to thereby obtain a specimen 130 of coherent or condensed matter 131. The system 100 may further comprise a second assembly 160 configured to detect at least one distinctive feature 150 of at least one non-gaseous material 132 comprised in the specimen 130. The second assembly 160 may comprise a sensor system 162. The system 100 may further comprise an electronic converter 175, configured to transform a first signal 165 received from a sensor system 162 into analog or digital electronic data 180 in a format for display or transmission by a communications interface 185. The first signal 165 may comprise an intensity information, the intensity information may comprise, for example, one or more discrete values or a continuum of values. The system 100 may further comprise a control unit 170 configured to perform a plurality of process steps, for example, at least partially sequential, each process step is performed at least one time, in any order, and without an operator interaction to thereby define a hands-off, near real-time detection cycle. The plurality of process steps may comprise: (a) sampling 124 the plurality of airborne particulate matter 121, (b) detecting 150 the at least one distinctive feature, and (c) transforming the first signal 165 received from the sensor system 162 into the electronic data 180. The control unit 170 may be further configured to perform the process step (a) 124 over a first period of time to thereby define a sampling time. In one embodiment the sampling time may range from 1 second to 12 hours. In another embodiment, the sampling time is approximately 1 minute. The control unit 170 may be further configured to perform the detection cycle over a second period of time to thereby define a cycle time. An air flow of environmental air may be directed from an intake 120 through the first assembly 110 to an exhaust 126. In one embodiment, the electronic data 180 may be transferred to and displayed by a desktop personal computer 195. In another embodiment, the electronic data 180 may be transmitted to a cloud data storage and computing system 190. The electronic data 180 may comprise at least one information about at least one biologic material 133 comprised in the specimen 130. See, for example, FIG. 8 for details.

In another exemplary embodiment of the present invention, the system 100 may be a stand-alone device configured to be used on-site for the detection of airborne contaminants.

In yet another exemplary embodiment of the present invention, the control unit 170 comprises a processor 172, and a non-transitory storage medium 174 readable by the processor 172. The non-transitory storage medium 174 may have stored thereon a set of instructions. The set of instructions when executed by the processor 172 may cause the control unit 170 to perform the plurality of process steps at least partially sequential, in any order, and each process step is performed at least one time as the set of instructions determines. In an exemplary embodiment, the control unit 170 may be further configured to perform a plurality of the detection cycle sequentially without an operator interaction. In another exemplary embodiment, the cycle time may not exceed 1 hour. See, for example, FIG. 8, FIG. 9, and FIG. 10 for details.

In another exemplary embodiment of the present invention, the first assembly 110 may comprise a precipitator 115 configured to utilize forces of an electrostatic or electromagnetic field to sample the plurality of airborne particulate matter 121. See, for example, FIG. 3 for details.

In yet another exemplary embodiment of the present invention, the sampling process 124 may employ, and the first assembly 110 may be, respectively, configured to employ a pressure difference adjacent a filter and suction forces. In yet another exemplary embodiment of the present invention, the sampling process 124 may employ, and the first assembly 110 may be, respectively, configured to employ impinging forces.

In yet another exemplary embodiment of the present invention, the first assembly 110 comprises a particle counter 111 configured to count particles comprised in the plurality of airborne particulate matter 121. The plurality of process steps may further comprise: (d) counting particles. The control unit 170 may be further configured to determine the sampling time responsive to a second signal derived from the process step (d). In another exemplary embodiment, the control unit 170 may be further configured to modify the sampling time from information received from process step (d). See, for example, FIG. 9 for details.

In another exemplary embodiment of the present invention, the first assembly 110 further comprises a plasma etching unit 116 configured to annihilate and/or evaporate at least partially the specimen 130. The plurality of process steps may further comprise: (e) annihilating or evaporating at least partially the specimen 130. See, for example, FIG. 6, and FIG. 9 for details.

In yet another an exemplary embodiment of the present invention, the coherent or condensed matter 131 may be sampled adjacent a substrate 140. The coherent or condensed matter 131 or the specimen 130, respectively, may adhere to the substrate 140. In one embodiment, the substrate 140 may have a surface area adjacent the specimen 130 that may vary in size from 0.1 to 500 square millimeters. In another embodiment, that surface area may be approximately 10 square millimeters. The first assembly 110 may further comprise a handling unit 117 configured to replace or recycle the substrate 140. The plurality of process steps may further comprise: (f) replacing or recycling the substrate 140. See, for example, FIG. 7, FIG. 9, and FIG. 10 for details.

In one or more embodiments, the substrate 140 may comprise at least one of the following: an adhesive surface, a nano-porous surface, a coating of a thin film, a coating comprising nanoscale islands of a conductor or semiconductor, an array of nanoscale pillars, a woven surface, a non-woven surface, a texture configured to attract microbial structures, a ceramic material, a glass material, a metal material, a plastic material, a transparent or translucent material, a surface structure to attract and bind at least portions of the microbial or biologic material, optical on-chip components, microfluidic components, an array of nanoscale structures, and/or the like.

In one or more exemplary embodiments of the present invention, the substrate 140 is configured to enhance a plasmon resonance involving molecules of the specimen 130 to thereby enhance the yield rate of Raman scattered photons emitted by at least one molecule comprised in the specimen 130. The substrate 140 may comprise at least one enhancement structure 141. In one exemplary embodiment, the enhancement structure 141 comprises a nanotube. In another embodiment, the enhancement structure 141 comprises a nanotip. In yet another embodiment, the enhancement structure 141 comprises a nanoscale island. In yet another embodiment, the enhancement structure 141 comprises a nanoscale pillar. The nano-islands may comprise conductor or semiconductor material. In yet another embodiment, the enhancement structure 141 comprises an antibody sequence. In yet another embodiment, the enhancement structure 141 comprises a nanoscale tag. In yet another embodiment, the enhancement structure 141 comprises a rough surface. In yet another embodiment, the enhancement structure 141 comprises a nanoscale particle. In yet another embodiment, the enhancement structure 141 comprises a colloid. In yet another embodiment, the enhancement structure 141 comprises a reflective surface. In yet another embodiment, the enhancement structure 141 comprises a thin film. In yet another embodiment, the enhancement structure 141 comprises a microfluidic component. In yet another embodiment, the enhancement structure 141 comprises an array of nanoscale structures. In yet another embodiment, the enhancement structure 141 comprises a nanoscale assay. See, for example, FIG. 2, and FIG. 10 for details.

In another exemplary embodiment of the present invention, the first assembly 110 further comprises a first supply unit 112 configured to disburse at least one material (e.g. 122) configured to adhere to the coherent or condensed matter 131. In yet another exemplary embodiment of the present invention, the first assembly 110 further comprises a second supply unit 113 configured to create and disburse solid airborne nanoscale particles 122. The solid airborne nanoscale particles 122 may comprise a noble metal. After mixing the plurality of airborne particulate matter 121 with the airborne solid nanoscale particles 122 and after the sampling process 124, the coherent or condensed matter 131 may comprise at least a portion of nanoscale particles 134. In one exemplary embodiment, the at least one material configured to adhere to the coherent or condensed matter 131 may comprise particles (e.g. 134). In another embodiment, the at least one material configured to adhere to the coherent or condensed matter 131 may comprise colloids. In yet another embodiment, the at least one material configured to adhere to the coherent or condensed matter 131 may comprise a chemical reagent. In yet another embodiment, the at least one material configured to adhere to the coherent or condensed matter 131 may comprise magnetic tags. In yet another embodiment, the at least one material configured to adhere to the coherent or condensed matter 131 may comprise aerosols. In yet another embodiment, the at least one material configured to adhere to the coherent or condensed matter 131 may comprise a biomarker. In yet another embodiment, the at least one material configured to adhere to the coherent or condensed matter 131 may comprise an ion marker. In yet another embodiment, the at least one material configured to adhere to the coherent or condensed matter 131 may comprise a clustered regularly interspaced short palindromic repeats (CRISPR)/CRISPR-associated (Cas) mediator. In yet another exemplary embodiment, the first supply unit 112 comprises at least one structural element. In one exemplary embodiment the structural element comprises at least one electrode. In another exemplary embodiment the structural element comprises a spark plug. In yet another exemplary embodiment the structural element comprises an ink-jet-type mechanism. In one embodiment the ink-jet-type mechanism employs, for example, a piezoelectric effect to separate and accelerate a small volume of a carrier liquid from a cartridge that contains colloids of silver in the direction of the air flow 120, to be subsequently subjected to the sampling process 124. In another embodiment the ink-jet-type mechanism employs, for example, a thermo-effect, where an electroconductive plate is configured to heat and push a small volume of a carrier liquid from a cartridge in the direction of the air flow 120, to be subsequently subjected to the sampling process 124, the carrier liquid, for example, being a suspension that comprises nanoscale particles. In yet another exemplary embodiment the structural element comprises an aerosolizing mechanism. In one or more embodiments, the aerosolizing mechanism may comprise a jet nebulizer, a mist nebulizer, an ultrasonic wave nebulizer, and/or a vibrating mesh nebulizer. In yet another exemplary embodiment the structural element comprises a depositing unit employing a deposition method for particles (e.g. 122, 134). In yet another exemplary embodiment the structural element comprises a depositing unit employing a deposition method for colloids. In yet another exemplary embodiment the structural element comprises a sputter unit employing a sputter deposition process. In yet another exemplary embodiment the structural element comprises a deposition unit employing a deposition method for fluids. In yet another exemplary embodiment the structural element comprises an ink-jet-type cartridge. In yet another exemplary embodiment the structural element comprises an ignition system. In yet another exemplary embodiment the structural element comprises a rotation mechanism for an electrode. In one or more embodiments, the rotation mechanism employs two ball bearings to hold the electrode, and a two intermeshing gears transmitting a rotational motion from an electromotor to the electrode. In yet another exemplary embodiment the structural element comprises a heating mechanism for an electrode. In one or more embodiments, the heating mechanism comprises a wire filament that is electrically heated that serves as an electrode. In yet another exemplary embodiment the structural element comprises a replacement mechanism for an electrode. In one or more embodiments the replacement mechanism comprises means for affixing the electrode, means for electrically connecting the electrode, and means to position the electrode. See, for example, FIG. 4, FIG. 5, and FIG. 9 for details.

In one exemplary embodiment of the present invention the at least one distinctive feature 150 of the at least one non-gaseous material 132 comprises an intensity of a nuclear magnetic resonance band. In another embodiment the at least one distinctive feature 150 comprises a spectrum and an intensity profile of a plurality of Raman scattered photons. In yet another embodiment the at least one distinctive feature 150 comprises an intensity profile of a nuclear magnetic resonance spectrum. In yet another embodiment the at least one distinctive feature 150 comprises an intensity of a plasmon resonance band. In yet another embodiment the at least one distinctive feature 150 comprises an intensity profile of a plasmon resonance spectrum. In yet another embodiment the at least one distinctive feature 150 comprises an intensity of an emission band. In yet another embodiment the at least one distinctive feature 150 comprises an intensity profile of an emission spectrum. In yet another embodiment the at least one distinctive feature 150 comprises an intensity of an absorption band. In yet another embodiment the at least one distinctive feature 150 comprises an intensity profile of an absorption spectrum. In yet another embodiment the at least one distinctive feature 150 comprises a macroscopic image. In yet another embodiment the at least one distinctive feature 150 comprises a microscopic image. In yet another embodiment the at least one distinctive feature 150 comprises an intensity of a mass-to-charge ratio interval or band. In yet another embodiment the at least one distinctive feature 150 comprises a polarization of an emission band. In yet another embodiment the at least one distinctive feature 150 comprises a polarization profile of an emission spectrum. In yet another the at least one distinctive feature 150 comprises a laser resonance lifetime decrease. In yet another embodiment the at least one distinctive feature 150 comprises an emission lifetime. In yet another embodiment the at least one distinctive feature 150 comprises a lifetime profile of an emission spectrum. In yet another embodiment the at least one distinctive feature 150 comprises an anisotropy of an emission scatter. In yet another embodiment the at least one distinctive feature 150 comprises an anisotropy profile of an emission spectrum. In yet another embodiment the at least one distinctive feature 150 comprises an intensity of an alpha radiation. In yet another embodiment the at least one distinctive feature 150 comprises an intensity of a beta radiation. In yet another embodiment the at least one distinctive feature 150 comprises an intensity of a gamma radiation. In yet another embodiment the at least one distinctive feature 150 comprises an intensity profile of a mass-to-charge spectrum or histogram.

In another exemplary embodiment of the present invention, the second assembly 160 is configured to detect the at least one distinctive feature 150 of the at least one non-gaseous material 132 to thereby determine an information. In one embodiment, the information comprises an identity of the at least one non-gaseous material 132. In another embodiment, the information comprises a probability of an identity of the at least one non-gaseous material 132. In yet another embodiment, the information comprises a ratio profile of a plurality of constituent atomic content of the at least one non-gaseous material 132. In yet another embodiment, the information comprises a profile of a plurality of constituent molecular bonds of the at least one non-gaseous material 132. In yet another embodiment, the information comprises a classifying indication of the at least one non-gaseous material 132. In yet another embodiment, the information comprises a probability of a classifying identity of the at least one non-gaseous material 132. In yet another embodiment, the information comprises an amount of the at least one non-gaseous material 132. In yet another embodiment, the information comprises an amount of a class of the at least one non-gaseous material 132. In yet another embodiment, the information comprises a differentiation between at least two of the non-gaseous materials 132.

In yet another exemplary embodiment of the present invention, the second assembly 160 is further configured to sense at least one phenomenon of physics. In one embodiment, the phenomenon of physics comprises a macroscopic image. In another embodiment, the phenomenon of physics comprises a microscopic image. In yet another embodiment, the phenomenon of physics comprises an absorption spectrum. In yet another embodiment, the phenomenon of physics comprises an emission spectrum. In yet another embodiment, the phenomenon of physics comprises an information of a particle size. In yet another embodiment, the phenomenon of physics comprises an information of a particle shape. In yet another embodiment, the phenomenon of physics comprises a Raman scattering. In yet another embodiment, the phenomenon of physics comprises a Rayleigh scattering. In yet another embodiment, the phenomenon of physics comprises a Mie scattering. In yet another embodiment, the phenomenon of physics comprises a Tyndall scattering. In yet another embodiment, the phenomenon of physics comprises a mass spectrum or histogram. In yet another embodiment, the phenomenon of physics comprises a nuclear magnetic resonance spectrum. In yet another embodiment, the phenomenon of physics comprises a cavity ring-down laser absorption spectrum. In yet another embodiment, the phenomenon of physics comprises a laser-induced breakdown emission. In yet another embodiment, the phenomenon of physics comprises a spark-induced breakdown emission. In yet another embodiment, the phenomenon of physics comprises a thermal emission. In yet another embodiment, the phenomenon of physics comprises an intrinsic photoluminescence. In yet another embodiment, the phenomenon of physics comprises a photoluminescence of a marker reagent. In yet another embodiment, the phenomenon of physics comprises a photoluminescence of LIVE/DEAD marker. In yet another embodiment, the phenomenon of physics comprises a chromogenic effect. In yet another embodiment, the phenomenon of physics comprises a rovibrational transition of molecules in the infrared spectrum. In yet another embodiment, the phenomenon of physics comprises a plasmon resonance. In yet another embodiment, the phenomenon of physics comprises an enhanced plasmon resonance. In yet another embodiment, the phenomenon of physics comprises a clustered regularly interspaced short palindromic repeats (CRISPR) mediated surface-enhanced Raman scattering (SERS). In yet another embodiment, the phenomenon of physics comprises a fluorescence lifetime. In yet another embodiment, the phenomenon of physics comprises a multiphoton excited fluorescence. In yet another embodiment, the phenomenon of physics comprises an emission anisotropy. In yet another embodiment, the phenomenon of physics comprises a change in polarization.

In one embodiment, the absorption spectrum is detected by directing a source of bright white light to the specimen 130 and by receiving a reflection scatter by means of the sensor system 162 from the specimen 130. When the spectrum of the white light is compared with spectrum of the reflection scatter, the profile of reduction of certain bands may represent the absorption spectrum. In another embodiment, the particle shape and the particle size are detected by detecting by means of a sensor system 162 the shadowing effect of the particles in the specimen 130 in response to an exposure by a light source. In yet another embodiment, the Rayleigh scattering emitted by the specimen 130 in response to a, for example, bright white light is detected by means of a sensor system 162. In yet another embodiment, the polarization of the Rayleigh scatter is detected. In yet another embodiment, the Mie scattering in response to a laser beam excitement that is configured to pass through the specimen 130 is detected by collecting with a sensor system 162 the Mie scatter at an angle to the direction of the laser beam, for example, at 30 and 90 degrees.

In one embodiment, a liquid is utilized in the sampling process to form the specimen 130, so that the particles are washed out of the air flow 126 comprising the airborne particulate matter 121 to thereby make the particulate matter available for detection as a suspension 130/131. The first assembly 110 may be configured prepared to excite and detect a Tyndall scattering. In yet another embodiment, the mass spectrum or histogram is detected by subjecting the specimen 130 to a high vacuum, for example <0.1 Pascal (Pa), and expose the specimen 130 to electron ionization.

In yet another embodiment, the second assembly 160 is configured to excite a plurality of atomic nuclei comprised in the specimen 130 with strong radio waves and detect local magnetic fields around the plurality of atomic nuclei by sensitive radio receivers 162, to thereby acquire the nuclear magnetic resonance spectrum.

In yet another embodiment, the cavity ring-down laser absorption spectrum is acquired by positioning the specimen 130 into a laser resonance zone or chamber, detecting an intra cavity absorption. In yet another embodiment, the laser-induced breakdown emission is detected after exposing the specimen 130 to a laser beam, having sufficient energy to break up molecules comprised in the specimen 130. In yet another embodiment, the spark-induced breakdown emission is detected after positioning the specimen 130 between two electrodes configured to generate a spark discharge, having sufficient energy to break up molecules comprised in the specimen 130.

In another exemplary embodiment of the present invention, the at least one non-gaseous material 132 comprises at least one biological material 133. The second assembly 160 is configured to detect the at least one distinctive feature 150 of the at least one biological material 133, or portions thereof. In one embodiment, the biologic material 133 comprises a living microorganism. In another embodiment, the biologic material 133 comprises a non-living microbial compound. In yet another embodiment, the biologic material 133 comprises a cell. In yet another embodiment, the biologic material 133 comprises a bacterium. In yet another embodiment, the biologic material 133 comprises a virus. In yet another embodiment, the biologic material 133 comprises a fungi. In yet another embodiment, the biologic material 133 comprises a protist. In yet another embodiment, the biologic material 133 comprises a protozoa. In yet another embodiment, the biologic material 133 comprises an archaea. In yet another embodiment, the biologic material 133 comprises a parasite. In yet another embodiment, the biologic material 133 comprises a prion. In yet another embodiment, the biologic material 133 comprises a gene. In yet another embodiment, the biologic material 133 comprises a genome. In yet another embodiment, the biologic material 133 comprises a deoxyribonucleic acid (DNA). In yet another embodiment, the biologic material 133 comprises a ribonucleic acid (RNA). In yet another embodiment, the biologic material 133 comprises a microbial metabolic substance. In yet another embodiment, the biologic material 133 comprises an adenosine triphosphate (ATP). In yet another embodiment, the biologic material 133 comprises a nicotinamide adenine dinucleotide (NAD). In yet another embodiment, the biologic material 133 comprises a nicotinamide adenine dinucleotide in oxidized form (NAD+). In yet another embodiment, the biologic material 133 comprises a nicotinamide adenine dinucleotide in reduced form (NADH). In yet another embodiment, the biologic material 133 comprises a short chain fatty acid (SCFA). In yet another embodiment, the biologic material 133 comprises a Riboflavin. In yet another embodiment, the biologic material 133 comprises a dipicolinic acid. In yet another embodiment, the biologic material 133 comprises a protein. In yet another embodiment, the biologic material 133 comprises an amino sequence. In yet another embodiment, the biologic material 133 comprises an antibody.

In one exemplary embodiment of the present invention, the first assembly 110 and/or the second assembly 160 are further configured to detect the at least one distinctive feature 150 of the at least one non-gaseous material 132 without a laboratory process of cell growth. In another embodiment, the first assembly 110 and/or the second assembly 160 are further configured to detect the at least one distinctive feature 150 of the at least one non-gaseous material 132 with a laboratory process of cell growth.

In one exemplary embodiment of the present invention, the first assembly 110 and/or the second assembly 160 are further configured to detect the at least one distinctive feature 150 of the at least one non-gaseous material 132 without a laboratory process of incubation. In another embodiment, the first assembly 110 and/or the second assembly 160 are further configured to detect the at least one distinctive feature 150 of the at least one non-gaseous material 132 with a laboratory process of incubation.

In one exemplary embodiment of the present invention, the first assembly 110 and/or the second assembly 160 are further configured to detect the at least one distinctive feature 150 of the at least one non-gaseous material 132 without a laboratory process of cell lysis. In another embodiment, the first assembly 110 and/or the second assembly 160 are further configured to detect the at least one distinctive feature 150 of the at least one non-gaseous material 132 with a laboratory process of cell lysis.

In one exemplary embodiment of the present invention, the first assembly 110 and/or the second assembly 160 are further configured to detect the at least one distinctive feature 150 of the at least one non-gaseous material 132 without a laboratory process adding a liquid for sampling. In another embodiment, the first assembly 110 and/or the second assembly 160 are further configured to detect the at least one distinctive feature 150 of the at least one non-gaseous material 132 with a laboratory process adding a liquid for sampling.

In one exemplary embodiment of the present invention, the first assembly 110 and/or the second assembly 160 are further configured to detect the at least one distinctive feature 150 of the at least one non-gaseous material 132 without a laboratory process adding a liquid for detection. In another embodiment, the first assembly 110 and/or the second assembly 160 are further configured to detect the at least one distinctive feature 150 of the at least one non-gaseous material 132 with a laboratory process adding a liquid for detection.

In one exemplary embodiment of the present invention, the first assembly 110 and/or the second assembly 160 are further configured to detect the at least one distinctive feature 150 of the at least non-gaseous material 132 without a laboratory process of a polymerase chain reaction (PCR). In another embodiment, the first assembly 110 and/or the second assembly 160 are further configured to detect the at least one distinctive feature 150 of the at least one non-gaseous material 132 with a laboratory process of a polymerase chain reaction (PCR).

In another exemplary embodiment of the present invention, the substrate 140 may be heated to break up a microbial double-helix polynucleotide.

In one exemplary embodiment of the present invention, the first assembly 110 and/or the second assembly 160 are further configured to detect the at least one distinctive feature 150 of the at least one non-gaseous material 132 without a laboratory process of a nucleic acid amplification process. In another embodiment, the first assembly 110 and/or the second assembly 160 are further configured to detect the at least one distinctive feature 150 of the at least one non-gaseous material 132 with a laboratory process adding of a nucleic acid amplification process.

In one exemplary embodiment of the present invention, the second assembly 160 may comprise at least one of the following: a prism, a diffraction grating, a collimator, an object lens, an focusing mirror, a Peltier element, an optical slit or slit diaphragm, an avalanche diode, a photo diode, a laser, an LED, a lamp, a laser diode, a photon multiplier tube, a charge-coupled device (CCD) array, a CCD line sensor, a photo diode array, a photo-sensitive element, an absorptive filter, an interference filter, a dichroic filter, a dichroic reflector, a bandpass filter/reflector, a short-pass filter/reflector, a long-pass filter/reflector, a beam blocker, a filter configured to block an electromagnetic radiation exciting the specimen 130, a filter/reflector transmitting more than one band of wavelength, an absorptive polarizer, a Fresnel polarizer, a birefringent polarizer, a thin film polarizer, a wire-grid polarizer, and/or the like.

The sensor system 162 may be cooled to improve the noise/signal ratio of the first signal 165.

In one exemplary embodiment of the present invention, the process step (b) detecting the at least one distinctive feature 150 may comprise a step of analyzing in the specimen 130 a parameter related to at least one of the following: particle shape, size, refractive index, absorption, molecular structures, molecular composition, chemical reactions, and/or the like.

In an exemplary embodiment of the present invention, the first assembly 110 may further comprise means to generate and direct the airflow 120, 126. The exhaust air 126 may be filtered by an electrostatically charged panel filter that may comprise coarse fibers. The filter panel may be replaced or may be washed and reused.

In one exemplary embodiment of the present invention, the system 100 is further configured to be battery operated. In another exemplary embodiment, the system 100 is configured to be handheld. In yet another exemplary embodiment, the system 100 is further configured to be operated hands-off.

In yet another exemplary embodiment of the present invention, the system 100 may further comprise a power supply. In one embodiment, the power supply may accommodate an electrical supply in a wide range between 90 VAC and 600 VAC. In another embodiment, the power supply may accommodate an electrical supply in a range between 12 V AC/DC and 48 V AC/DC. In one exemplary embodiment of the present invention, the system 100 may weigh between 500 grams and 10 kilograms. In another embodiment that weight may be less than approximately 2 kilograms. In one embodiment, the system 100 may have an overall envelope of 0.1 liters to 50 liters. In another embodiment that overall envelope may be less than approximately 3 liters.

In an exemplary embodiment of the present invention, the system 100 may further comprise a hardwired communication interface 185. In another embodiment the system 100 may further comprise a wireless communication interface 185. The communication interface 185 may be configured to provide to a remote unit a set of driver instructions so that the remote unit is used as a terminal to thereby control the system 100. The hardwired interface configurations may include one or more of the following ports and communications protocols: USB, including, but not limited to USB-C, LAN, RS 232, RS 422, RS 485, Ethernet, serial ATA, SCSI, Firewire, Display Data Channel, VGA, HDMI, PS/2, Apple Desktop Bus, and/or the like. The wireless interface configuration may include one or more of the following technologies and communication protocols: Bluetooth, ZigBee, Wi-Fi, IEEE 802.x, GSM, HSDPA, CDMA, GPRS, 3G, 4G, 5G, LTE, mobile satellite communications, LPWAN, LoRaWAN, other internet of things (IoT) communication technologies and communication protocols, and/or the like. In an exemplary embodiment, the system 100 is, for example, configured to be remote controlled via USB, Bluetooth, LTE, G5, LoRaWAN, and WiFi communication protocols.

In an exemplary embodiment of the present invention, the system 100 may further comprise detection units to measure humidity and temperature of the air flow 120. The processing of the electronic detection data 180 representing the presence and an amount of a certain biologic material 133 in the specimen 130 may be correlated to data derived from the measurement of humidity and temperature of the air flow 120.

Figure 8:
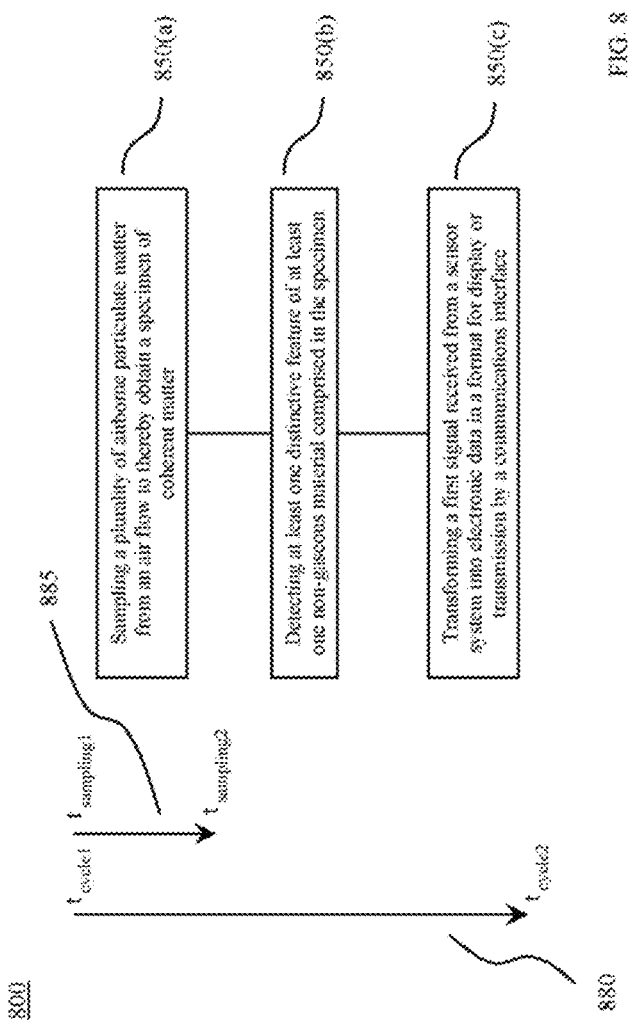
FIG. 8 is a schematic explanatory view illustrating an exemplary embodiment of a flow diagram for a plurality of process steps for the detection of airborne contaminants, in accordance with one or more embodiments of the present invention.
Figure 9:
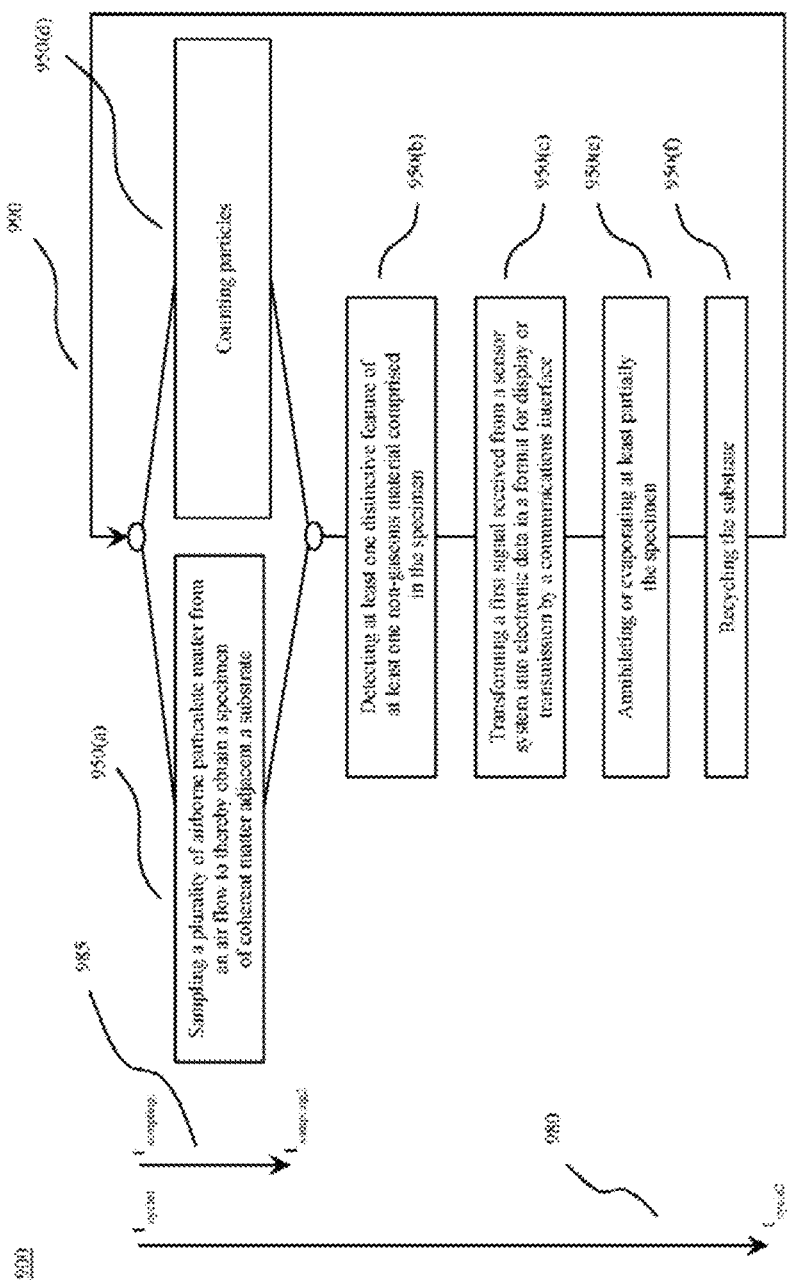
FIG. 9 is a schematic explanatory view illustrating another exemplary embodiment of a flow diagram for a plurality of process steps for the detection of airborne contaminants, in accordance with one or more embodiments of the present invention.
Figure 10:
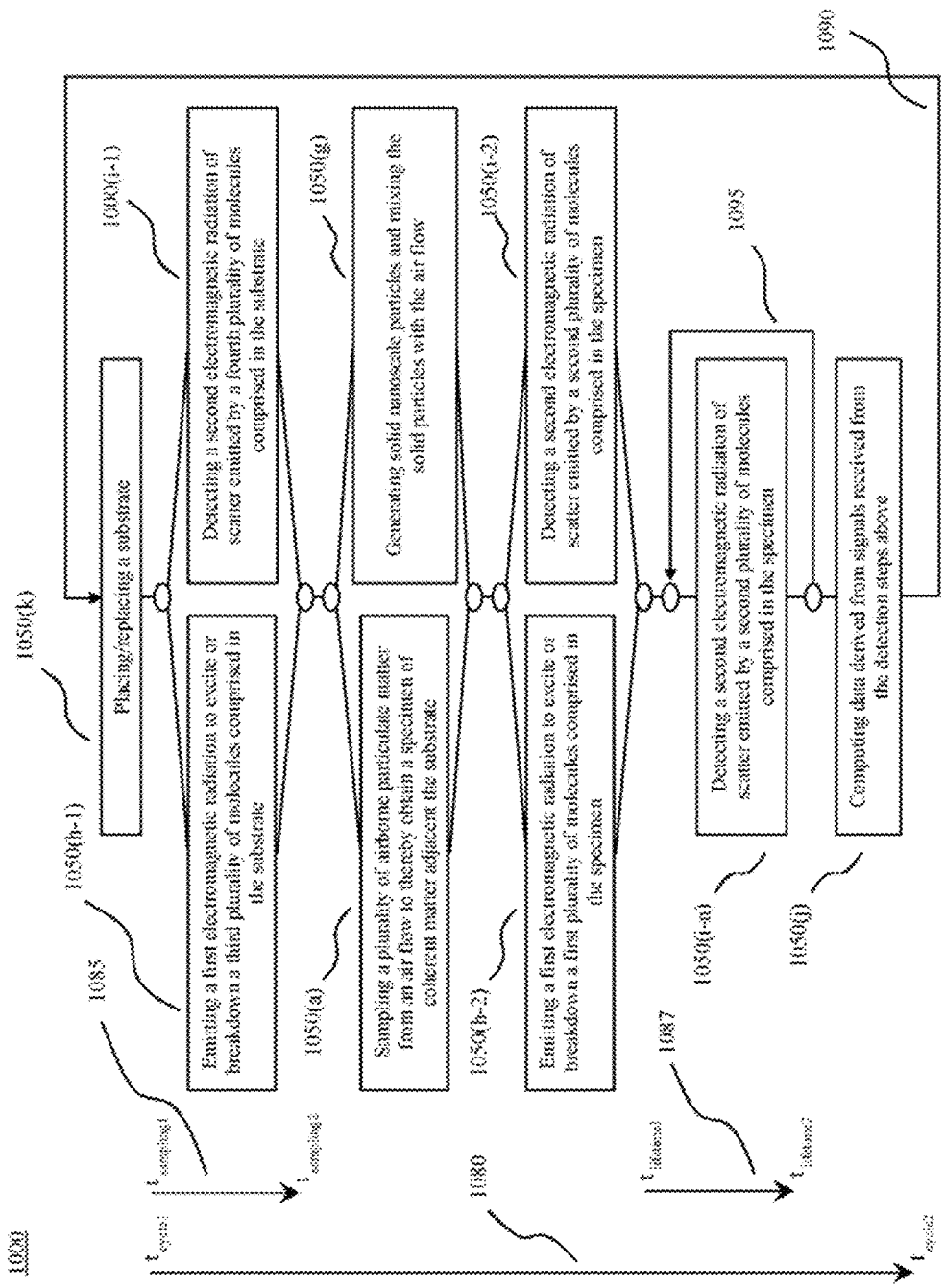
FIG. 10 is a schematic explanatory view illustrating yet another exemplary embodiment of a flow diagram for a plurality of process steps for the detection of airborne contaminants, in accordance with one or more embodiments of the present invention.

Without limiting the foregoing and unless the context requires otherwise, the sampling time referenced in respect to FIG. 1 may represent the same or similar sampling time 885, 985, and 1085 as shown in and described with respect to FIG. 8, FIG. 9, and FIG. 10, respectively, and vice versa. Without limiting the foregoing and unless the context requires otherwise, the cycle time referenced in respect to FIG. 1 may represent the same or similar cycle time 880, 980, and 1080 as shown in and described with respect to FIG. 8, FIG. 9, and FIG. 10, respectively, and vice versa. Without limiting the foregoing and unless the context requires otherwise, the lifetime referenced in respect to FIG. 1 may represent the same or similar lifetime scatter lifetime 1087 as shown in and described with respect to FIG. 10, and vice versa. Without limiting the foregoing and unless the context requires otherwise, the detection cycle referenced in respect to FIG. 1 may represent the same or similar cycle of processes steps 850(a) to 850 (c), the same or similar cycle of processes steps 950(a)/950(d) to 950(f), or the same or similar cycle of processes steps 1050(k) to 1050(j), including the iterations 1095, as shown in and described with respect to FIG. 8, FIG. 9, and FIG. 10, respectively, and vice versa.

Figure 2:
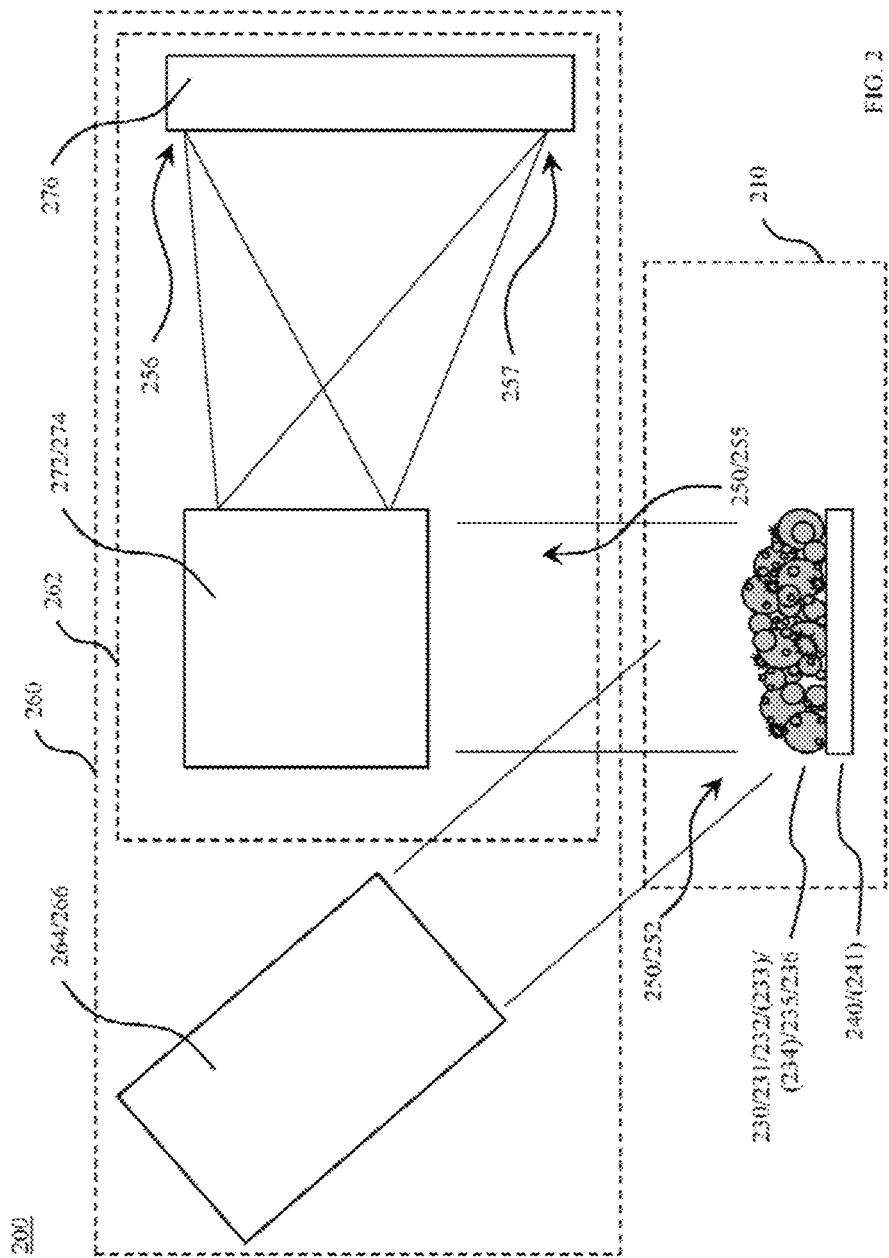

FIG. 2 is a schematic explanatory view illustrating another exemplary embodiment of a system for the detection of airborne contaminants, in accordance with one or more embodiments of the present invention.

Without limiting the foregoing and unless the context requires otherwise, the system 200 may represent the same, a similar or a subsystem of system 100 as shown in and described with respect to FIG. 1, and vice versa.

In one or more exemplary embodiments of the present invention, the second assembly 210 further comprises a source 264 configured to emit a first electromagnetic radiation 252 to excite or breakdown a first plurality of molecules 235 comprised in the specimen 230. The specimen 230 may comprise the coherent or condensed matter 231, the non-gaseous material 232, the biologic material 233, and/or the nanoscale particles 234, in any combination. The first electromagnetic radiation 252 may be, for example, generated by the source 264 and may be focused by an optical beam shaping assembly 266, and directed to the specimen 230. The sensor system 262 is configured to detect a second electromagnetic radiation 255 of scatter emitted by a second plurality of molecules 236 comprised in the specimen 230. The first electromagnetic radiation 252 comprises at least one band of wavelength or a spectrum in the wavelength range between 10 nanometer and 1 millimeter. The second electromagnetic radiation 255 comprises at least one band of wavelength or a spectrum in the wavelength range between 10 nanometer and 1 millimeter.

In another exemplary embodiment of the present invention, second assembly 260 further comprises at least one optical element 274 configured to decompose the second electromagnetic radiation 255 to receive at least one band 256, 257 or a continuum of its constituent wavelengths. The second electromagnetic radiation 255 emitted from the specimen 230 may be converged and focused by an optical collection assembly 272. In one exemplary embodiment of the present invention the sensor system 262 utilizes a charge-coupled effect. In another exemplary embodiment of the present invention the sensor system 262 utilizes a photon-multiplying effect. In yet another exemplary embodiment of the present invention the sensor system 262 utilizes an internal photoelectric effect. In yet another exemplary embodiment of the present invention the sensor system 262 utilizes an external photoelectric effect. In yet another exemplary embodiment of the present invention the sensor system 262 utilizes a photo-transistor effect. In yet another exemplary embodiment of the present invention the sensor system 262 utilizes a photo-diode effect. In yet another exemplary embodiment of the present invention the sensor system 262 utilizes a photo-resistor effect. In yet another exemplary embodiment of the present invention the sensor system 262 utilizes a photon-triggered electronic avalanche effect. The elements, first band of wavelength of second electromagnetic radiation 256, and second band of wavelength of second electromagnetic radiation 257, are schematically depicted in FIG. 2 as exemplary bands of wavelength decomposed by the optical element 274.

In another exemplary embodiment of the present invention, the sensor system 262 may comprise means configured to block Rayleigh scattered photons emitted, for example, from the second plurality of molecules 236 comprised in the specimen 230 or from the substrate 240.

In yet exemplary embodiment of the present invention, the optical element 274 may comprise a prism and/or a diffraction grating. The receiving optical system 276 may comprise a CCD array. The optical element 274, and the receiving optical system 276 may be configured that the intensity information of the sensor signal of the receiving optical system 276 correlates to the intensity profile of the spectrum of the second electromagnetic radiation 255. The spectrum of the second electromagnetic radiation 255 may include the first band of wavelength of second electromagnetic radiation 256, and the second band of wavelength of second electromagnetic radiation 257.

In another exemplary embodiment, the second electromagnetic radiation 255 comprises Raman scattered photons emitted from molecules of the specimen 230. The Raman scatter 255 to be detected, is, for example, enhanced or amplified by surface, tip, particle, colloid enhanced plasmon resonance effects, and/or the like.

In another embodiment, the receiving optical system 276 may comprise a photon-multiplier tube or an avalanche photodiode arranged in the direction of the optical path behind an optical slit or slit diaphragm, where both, the slit and the tube/diode are mounted on a linear optical table, configured to scan through the spectrum of the second electromagnetic radiation 255. The spectrum of the second electromagnetic radiation 255 may include the first band of wavelength of the second electromagnetic radiation 256, and the second band of wavelength of second electromagnetic radiation 257. Alternatively, for example, the optical slit or slit diaphragm, followed in the direction of the optical path by a photon-multiplier tube or an avalanche photodiode are mounted fix to a base of the second assembly 260, while the prism or the diffraction grating 274 are moved and/or turned, to thereby scan through the constituent wavelengths of second electromagnetic radiation 255. Alternatively, for example, the optical element 274 may comprise a filter followed in the direction of the optical path by the receiving optical system 276, configured to detect at least one band of wavelength of the second electromagnetic radiation 256/257.

In yet another exemplary embodiment of the present invention, the source 264 may be a diode laser, emitting a first electromagnetic radiation 252 with a center wavelength of about 532 nanometer directed to the specimen 230. The second electromagnetic radiation 255 may be a Raman spectrum that ranges up to 3600 $cm^{-1}$ wavenumbers. The Raman spectrum may be spread with a diffraction grating 274 having 1200 lines per millimeter and may be focused onto a CCD line sensor 276. The integration time of the CCD line sensor 276 may be 10 seconds. An analog/digital converter transforms the sensor signal of the CCD line sensor 276 into a digital format for further processing according to one or more other embodiments of the present invention.

In an exemplary embodiment of the present invention, the solid particles 234, the colloids, or the aerosols may have nanoscale size, and may comprise copper, noble metals, semiconductors, graphene, and/or the like. The solid nanoscale particles 234, nanoscale colloids, or nanoscale aerosols may be encoded with Raman reporters. The solid nanoscale particles 234, nanoscale colloids, or nanoscale aerosols may employ a covalent bonding, an electrostatic adsorption, or a hydrophobic interaction. The Raman reporter molecule may be conjugated to the surface of a nanoscale particle 234 to bind to a biomolecule with specificity, such as an antibody, peptide, targeting ligand, aptamer, and/or the like.

In yet another exemplary embodiment of the present invention, the substrate 240 may comprise a surface-enhanced Raman scattering (SERS)/tip-enhanced Raman scattering (TERS)-active substance (e.g. 241) that may comprise at least one of the following metals or alloys thereof: aluminum, silver, gold, copper, platinum, palladium, and/or the like; and/or a SERS/TERS-active surface topography (e.g. 241) comprising at least one of the following plasmonic structures: nanotubes, nanotips, separated nanoscale islands of coatings, nano-tags, nanoparticles, nanoscale pillars, and/or the like.

In yet another exemplary embodiment of the present invention, the substrate 240 may be translucent or transparent. The first electromagnetic radiation 252 may be directed to target a surface of the substrate 240 by total reflection or near total reflection from within the substrate 240 to excite and enhance a plasmon resonance involving molecules of the specimen 230 adjacent the surface of the substrate 240.

In yet another embodiment, the second assembly 260 is configured to detect a surface-enhanced Raman scattering (SERS) as described in detail above. The SERS effect is configured to be mediated by clustered regularly interspaced short palindromic repeats (CRISPR) specific gene-recognition to enhance specificity detecting genomes of certain biologic material 233, utilizing, for example, a nanoscale pillar array/assay configuration for on-site capture and detection of the biologic material 233 of interest.

Without limiting the foregoing and unless the context requires otherwise, the first assembly 210 may represent the same, a similar or a subsystem of element 110 as shown in and described with respect to in FIG. 1, and vice versa. Without limiting the foregoing and unless the context requires otherwise, the specimen 230, the coherent or condensed matter 231, the non-gaseous material 232, the biologic material 233, and the nanoscale particles 234 may represent the same or similar elements 130, 131, 132, 133, and 134, respectively, as shown in and described with respect to FIG. 1, and vice versa. Without limiting the foregoing and unless the context requires otherwise, the substrate 240, and the enhancement structure 241 may represent the same or similar elements 140, and 141, respectively, as shown in and described with respect to FIG. 1, and vice versa. Without limiting the foregoing and unless the context requires otherwise, the detection process of a distinctive feature 250 may represent the same or similar element 150 as shown in and described with respect to FIG. 1, and vice versa.

Without limiting the foregoing and unless the context requires otherwise, the sensor signal referenced in respect to FIG. 2 may represent the same or similar first signal 165 as shown in and described with respect to FIG. 1, and vice versa.

Figure 3:
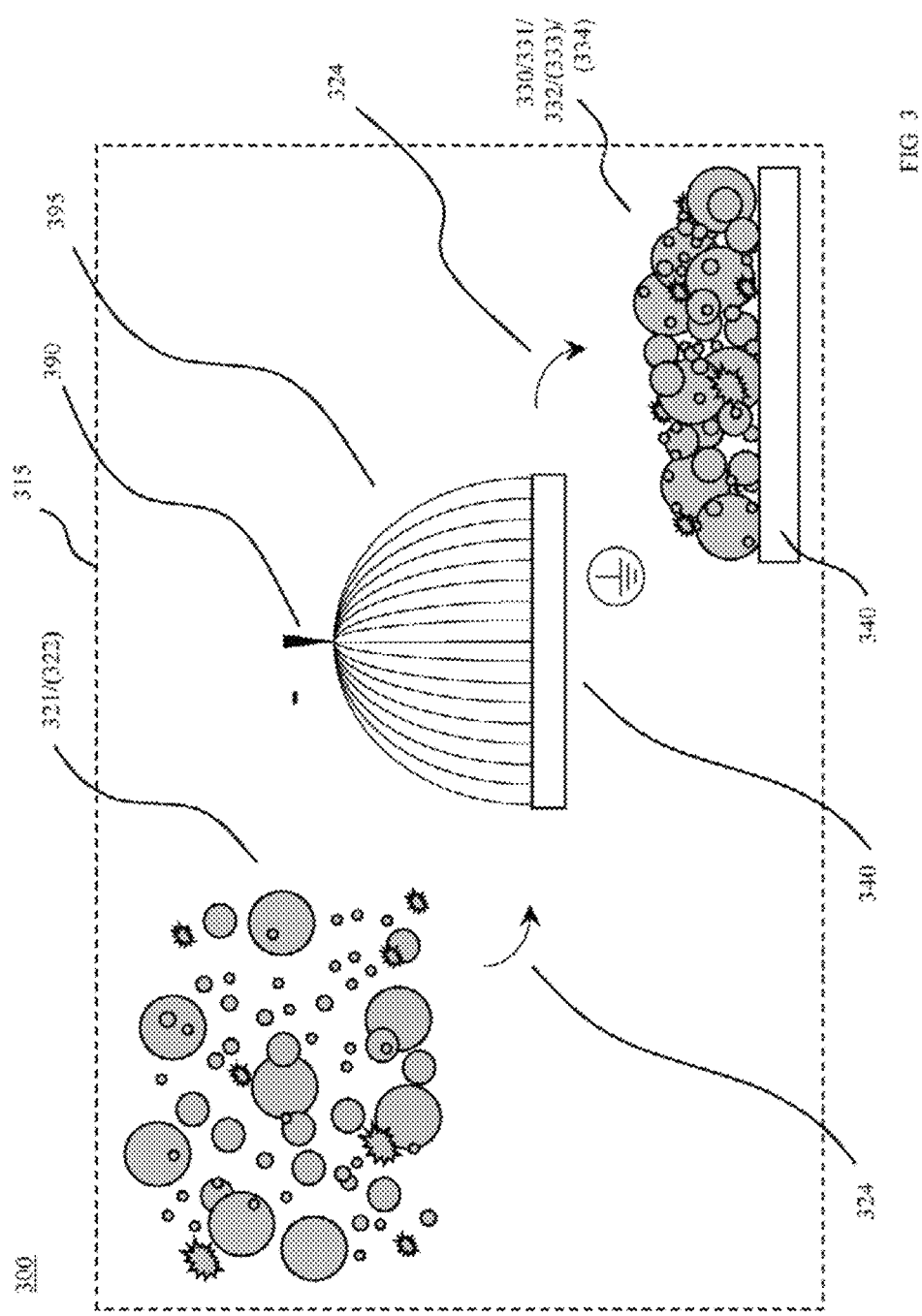

FIG. 3 is a schematic explanatory view illustrating an exemplary embodiment of a method and an electrostatic precipitator, in accordance with one or more embodiments of the present invention.

In one or more exemplary embodiments of the present invention, an active sampling process 300, 324 obtaining a specimen 330 of coherent or condensed matter 331 from a plurality of airborne particulate matter 321 utilizes electrostatic forces 324, 395. For example, an electrostatic precipitator 315 is employed. Airborne nanoscale particles 322 may be mixed with the plurality of airborne particulate matter 321 and subjected to the active sampling process 324. The coherent or condensed matter 331 may comprise the non-gaseous material 332, the biologic material 333, and/or the nanoscale particles 334, in any combination. An electrostatic field 395 is generated and located in the direction of an air flow between a substrate 340 that is, for example, electrically grounded and an electrode 390 that is, for example, negatively charged by a high voltage potential. In one embodiment, the potential between the electrode 390 and the substrate 340 may range from 1 kV to 50 kV. In another embodiment that voltage may be approximately 4 kV.

In another exemplary embodiment of the present invention, the substrate 340 may be made, for example, from silver, may have a round surface adjacent the specimen 330 of approximately 50 square millimeters, and may have a thickness of about 1 millimeter. The substrate 340 may be configured to be grounded as an electrode and may be positioned in the direction of the air flow behind and opposite to a pointy positively charged electrode 390, made, for example, of tungsten or the like. The voltage between the substrate 340 and the electrode 390 may be approximately 4 kV. The sampling time may be approximately 5 minutes.

Without limiting the foregoing and unless the context requires otherwise, the sampling process 324 may represent the same or a similar element 124 as shown in and described with respect to FIG. 1, and vice versa. Without limiting the foregoing and unless the context requires otherwise, the electrostatic precipitator 315 may represent the same, a similar or a subsystem of element 115 as shown in and described with respect to FIG. 1, and vice versa. Without limiting the foregoing and unless the context requires otherwise, the plurality of airborne particulate matter 321 and the airborne nanoscale particles 322 may represent the same or similar elements 121, and 122, respectively, as shown in and described with respect to FIG. 1, and vice versa. Without limiting the foregoing and unless the context requires otherwise, the specimen 330, the coherent or condensed matter 331, the non-gaseous material 332, the biologic material 333, and the nanoscale particles 334 may represent the same or similar elements 130, 131, 132, 133, and 134, respectively, as shown in and described with respect to FIG. 1, and vice versa. Without limiting the foregoing and unless the context requires otherwise, the substrate 340 may represent the same or similar element 140 as shown in and described with respect to FIG. 1, and vice versa.

Without limiting the foregoing and unless the context requires otherwise, the air flow referenced in respect to FIG. 3 may represent the same or similar air flow 120 as shown in and described with respect to FIG. 1, and vice versa. Without limiting the foregoing and unless the context requires otherwise, the sampling time referenced in respect to FIG. 3 may represent the same or similar sampling time referenced in respect to FIG. 1, and/or the same or similar sampling time 885, 985, and 1085 as shown in and described with respect to FIG. 8, FIG. 9, and FIG. 10, respectively, and vice versa.

Figure 4:
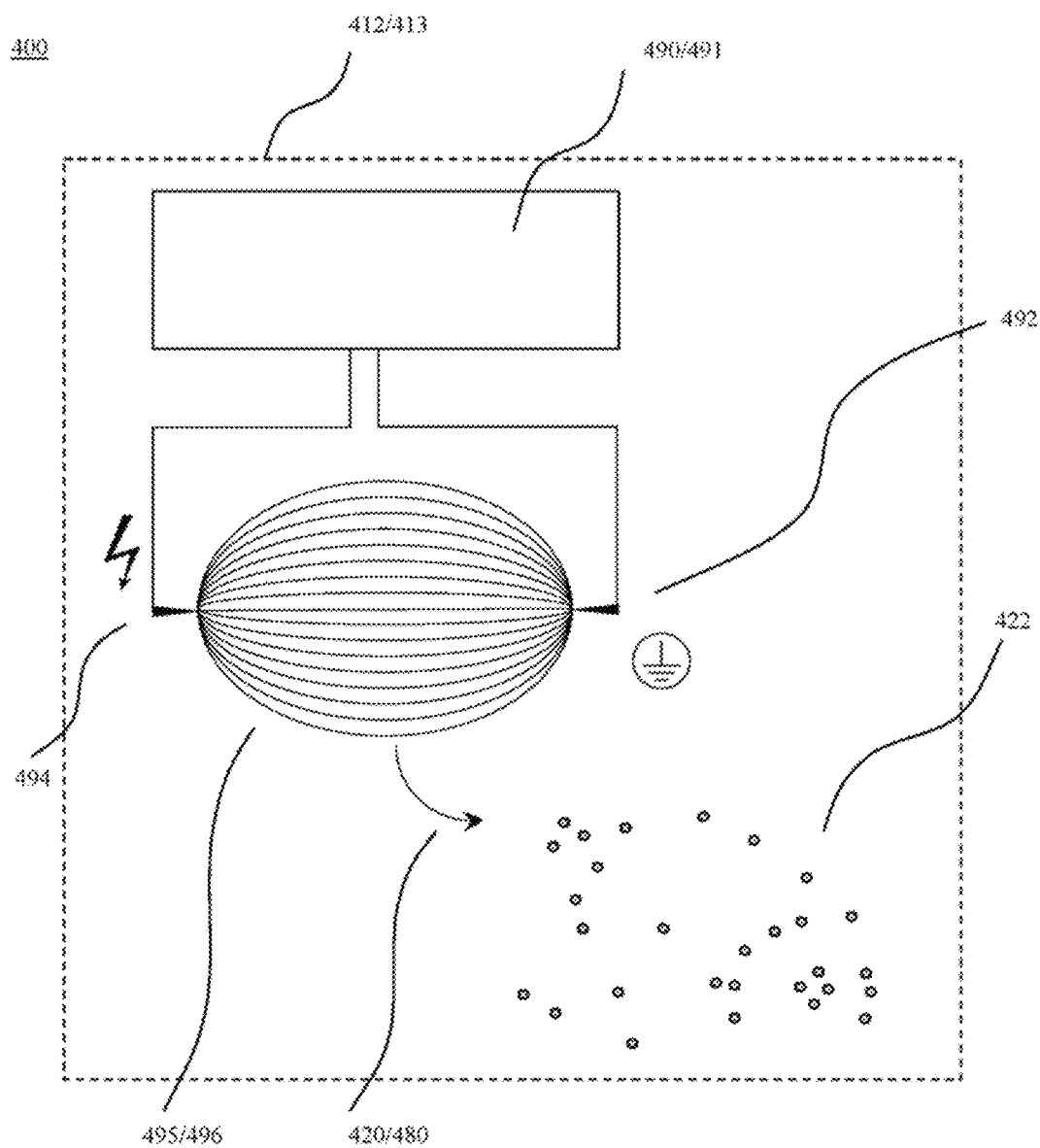

FIG. 4 is a schematic explanatory view illustrating an exemplary embodiment of a method and a generator to supply airborne nanoscale particles, in accordance with one or more embodiments of the present invention.

In one or more exemplary embodiments of the present invention the particle generation process 400 generates and disburses 480 airborne nanoscale particles 422 into an air flow 420. For example, a first supply unit 412, and/or a second supply unit 413 comprises two electrodes 492, 494 that are, for example, electrically connected to an ignition system 490 and a power supply 491. One electrode 492 is, for example, electrically grounded. The other electrode 494 is, for example, heated and electrically connected to a high voltage potential, resulting in an electrical field 495 to ignite a spark discharge 496. The electrodes 492, 494 may comprise, for example, copper, or a noble metal, such as silver, gold, platinum, palladium, and/or the like. In one embodiment, the voltage between the electrodes may range from 1 V to 50 kV. In another embodiment, the voltage may be approximately 4 kV.

In yet another exemplary embodiment of the present invention, the first supply unit 412, and/or the second supply unit 413 employs a spark induced emission process 400, 496 of airborne nanoscale particles 422. The first supply unit 412, and/or the second supply unit 413 may comprise one silver electrode 492 and one graphite electrode 494 having each a diameter of about 0.5 millimeter, positioned opposite to each other with a gap of approximately 1 millimeter. The ignition system 490 and the power supply 491 charging the electrodes 492, 496 with a voltage of approximately 4 kV. When a spark ignites, the voltage is reduced to support an electrical current of about 1 Amperes for a time of about 50 microseconds. Thereafter, the electrical current is cut off. A control units 490 is configured to generate about 10 sparks per minute.

Without limiting the foregoing and unless the context requires otherwise, the first supply unit 412, and the second supply unit 413 may represent the same, a similar or a subsystem of elements 112, and 113, respectively, as shown in and described with respect to FIG. 1, and vice versa. Without limiting the foregoing and unless the context requires otherwise, the airborne nanoscale particles 422 airborne nanoscale particles may represent the same or similar element 122 as shown in and described with respect to FIG. 1, and vice versa. Without limiting the foregoing and unless the context requires otherwise, the air flow 420 may represent the same or similar element 120 as shown in and described with respect to FIG. 1, and vice versa.

Figure 5:
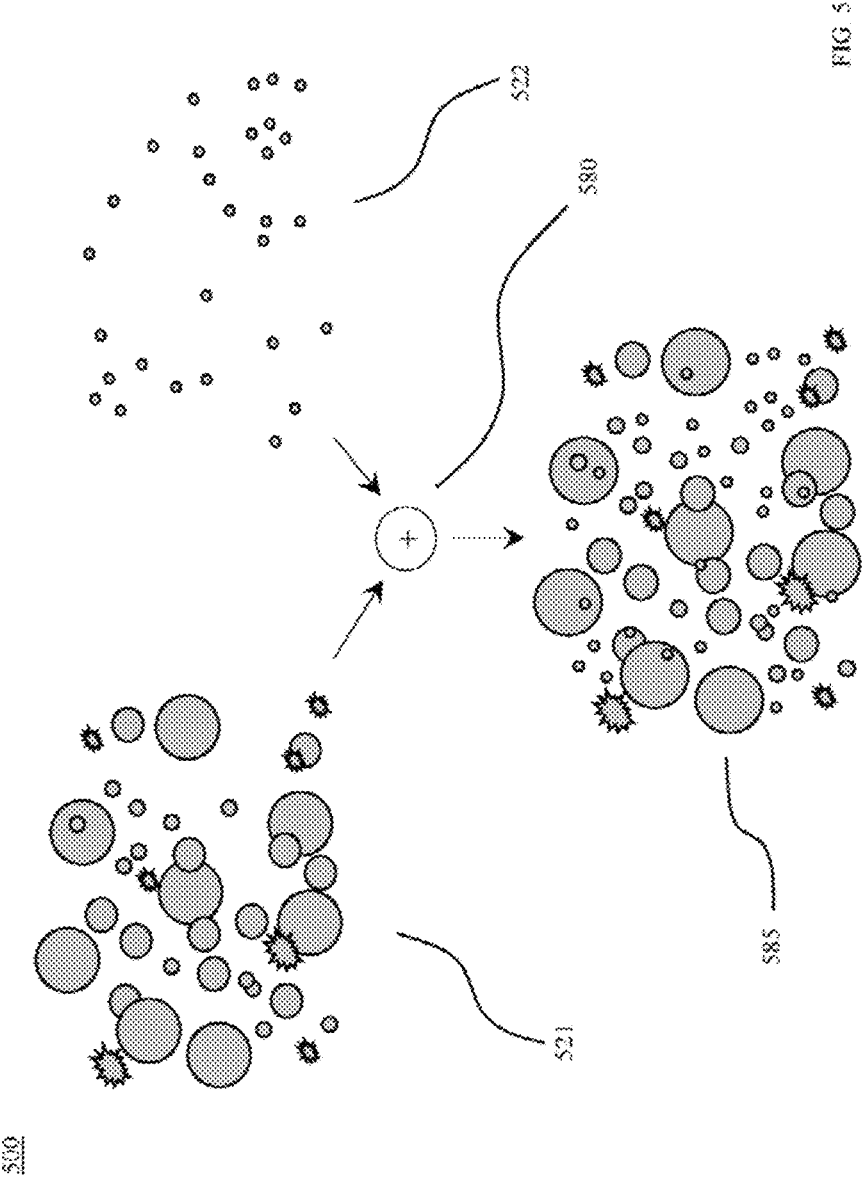

FIG. 5 is a schematic explanatory view illustrating an exemplary embodiment of a method to mix airborne particulate matter with nanoscale particles, in accordance with one or more embodiments of the present invention.

In one or more exemplary embodiments of the present invention the process of mixing particles 500, 580 combines airborne particulate matter 521 and airborne nanoscale particles 522 in an air flow 580, to thereby obtain an airborne mix of particles 585 that comprises a plurality of airborne particulate matter 521 and a plurality of airborne nanoscale particles 522.

Without limiting the foregoing and unless the context requires otherwise, the airborne nanoscale particles 522 airborne nanoscale particles may represent the same or similar elements 122, and 422 as shown in and described with respect to FIG. 1, and FIG. 4, respectively, and vice versa. Without limiting the foregoing and unless the context requires otherwise, the plurality of airborne particulate matter 521 may represent the same or similar element 121 as shown in and described with respect to FIG. 1, and vice versa. Without limiting the foregoing and unless the context requires otherwise, the air flow 580 may represent the same or similar element 120 as shown in and described with respect to FIG. 1, and vice versa.

Figure 6:
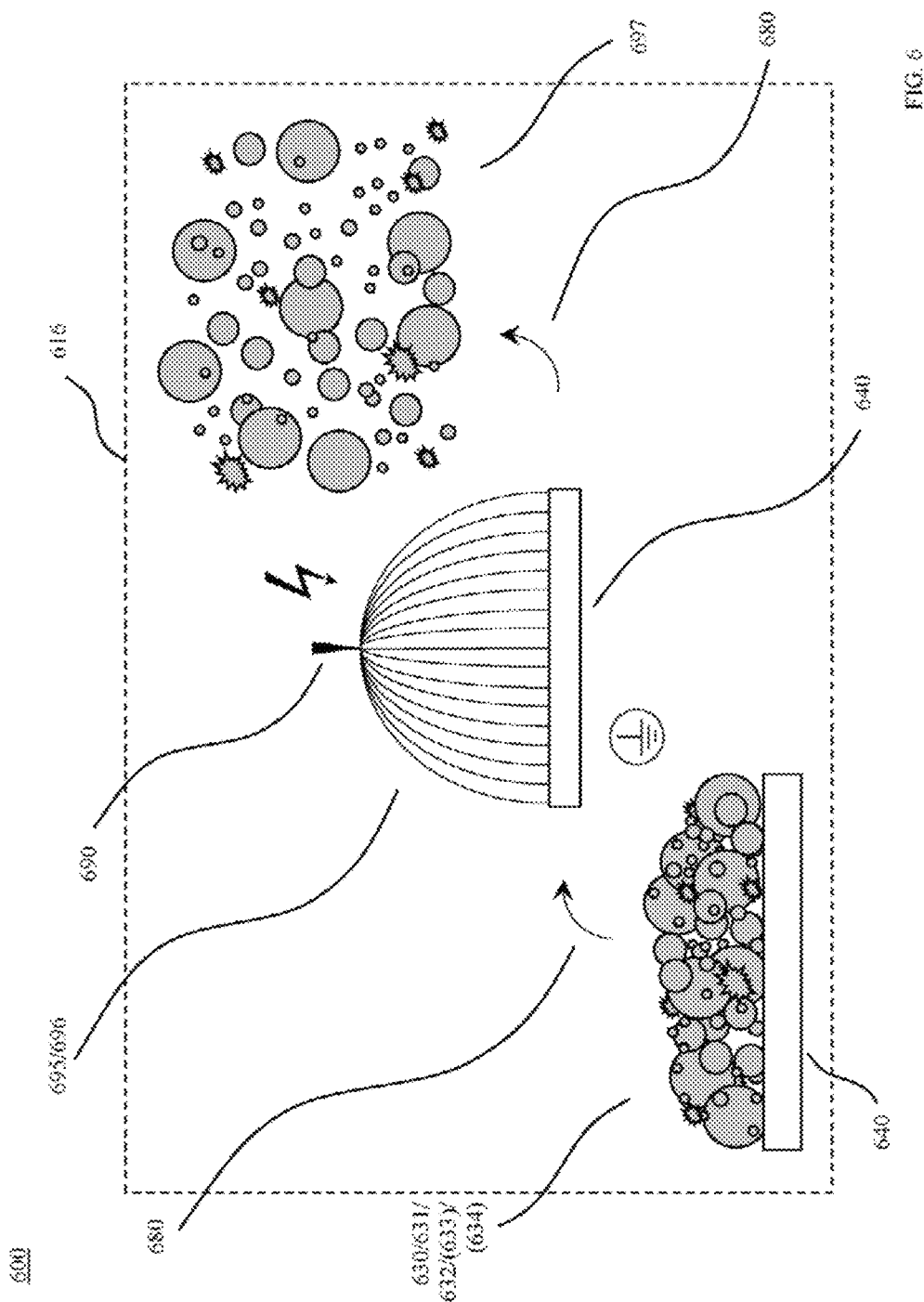

FIG. 6 is a schematic explanatory view illustrating an exemplary embodiment of a method and a plasma cleaning unit, in accordance with one or more embodiments of the present invention.

In one or more exemplary embodiments of the present invention, the plasma etching process 600, 680 annihilates and/or evaporates at least partially the specimen 630. For example, a plasma cleaning unit 616 is employed. The specimen 630 may comprise the coherent or condensed matter 631, the non-gaseous material 632, the biologic material 633, and/or the nanoscale particles 634, in any combination. An electrostatic field 695 is generated between a substrate 640 that is, for example, electrically grounded and an electrode 690 that is, for example, charged by a high voltage potential. A plasma discharge 696 is created adjacent the substrate 640. The specimen 630 is at least partially annihilated and/or evaporated so that a gaseous and non-gaseous exhaust 697 is generated, which is, for example, collected and disbursed by an exhaust air flow.

In yet another exemplary embodiment of the present invention, prior to plasma cleaning 600, 680, the biological material 633 comprised in the specimen 630 is inactivated by heating up the substrate 640 to approximately 200 degrees Celsius. In one embodiment, a tungsten electrode 690 may be positioned opposite to the surface of the substrate 640. An electric arc may be ignited between the tungsten electrode 690 and the substrate 640.

Without limiting the foregoing and unless the context requires otherwise, the plasma cleaning unit 616 may represent the same, a similar or a subsystem of element 116 as shown in and described with respect to FIG. 1, and vice versa. Without limiting the foregoing and unless the context requires otherwise, the specimen 630, the coherent or condensed matter 631, the non-gaseous material 632, the biologic material 633, and the nanoscale particles 634 may represent the same or similar elements 130, 131, 132, 133, and 134, respectively, as shown in and described with respect to FIG. 1, and vice versa. Without limiting the foregoing and unless the context requires otherwise, the substrate 640 may represent the same or similar element 140 as shown in and described with respect to FIG. 1, and vice versa.

Without limiting the foregoing and unless the context requires otherwise, the exhaust air flow referenced in respect to FIG. 6 may represent the same or similar air flow 126 as shown in and described with respect to FIG. 1, and vice versa.

Figure 7:
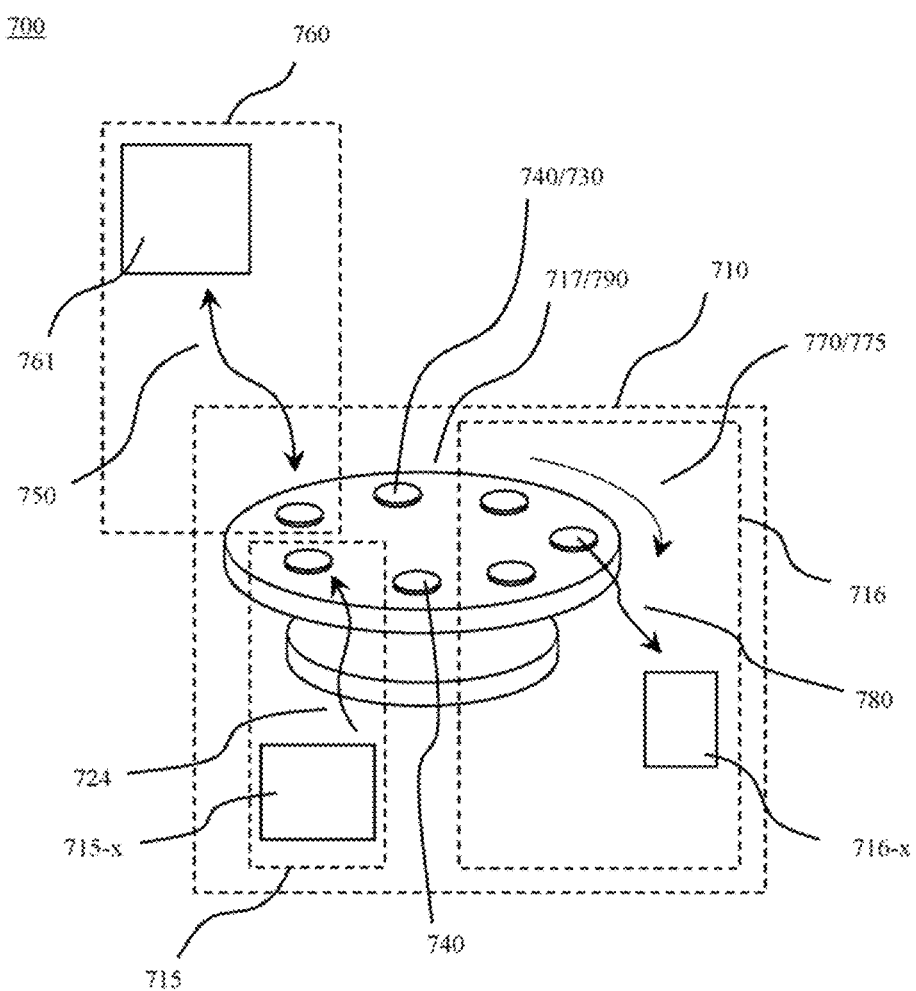
FIG. 7 is a schematic explanatory view illustrating an exemplary embodiment of yet another system for the detection of airborne contaminants, in accordance with one or more embodiments of the present invention.

FIG. 7 is a schematic explanatory view illustrating an exemplary embodiment of yet another system for the detection of airborne contaminants, in accordance with one or more embodiments of the present invention.

Without limiting the foregoing and unless the context requires otherwise, the system 700 may represent the same, a similar or a subsystem of system 100 and/or 200 as shown in and described with respect to FIG. 1 and FIG. 2, respectively, and vice versa.

In one or more exemplary embodiments of the present invention, the first assembly 710 comprises a precipitator 715, components of the precipitator 715-x, a plasma cleaning unit 716, components of plasma cleaning unit 716-x, and a handling unit 717. The second assembly 760 comprises components of second assembly 761, for example, a source, and a sensor system. The precipitator 715 may be configured to perform a sampling process 724, sampling a plurality of airborne particulate matter from an air flow to thereby obtain in each detection cycle of the handling process 770 a certain specimen of the plurality of specimen 730 of a certain coherent or condensed matter adjacent a certain substrate of the plurality of substrates 740. The second assembly 760 may be configured to perform a detection process of a distinctive feature 750 of a certain specimen of the plurality of specimen 730. The plasma cleaning unit 716 may be configured to perform a process of plasma etching 780 annihilating or evaporating at least partially the certain specimen of the plurality of specimen 730 adjacent a certain substrate of the plurality of substrates 740. The handling unit 717 comprises, for example a rotary indexing table 790. In an exemplary embodiment, a plurality of substrates 740 are affixed on the top side of the rotary indexing table 790, for example, in equidistant angles and in the same or similar distance from the rotary center. At the end of each cycle performing a sampling process 724, a detection process of a distinctive feature 750, and a process of plasma etching 780 the rotary indexing table 790 may be configured to perform an indexed rotary movement 775, to recycle and/or replace each certain substrate with a next-in-line certain substrate of the plurality of substrates 740.

Without limiting the foregoing and unless the context requires otherwise, the first assembly 710, the precipitator 715, the plasma cleaning unit 716, the handling unit 717, and the second assembly 760 may represent the same, a similar or a subsystem of elements 110, 115, 116, 117, and 160, respectively, as shown in and described with respect to FIG. 1, and vice versa. Without limiting the foregoing and unless the context requires otherwise, each certain specimen of the plurality of specimen 730 may represent the same or similar element 130 as shown in and described with respect to FIG. 1, and vice versa. Without limiting the foregoing and unless the context requires otherwise, each substrate of the plurality of substrates 740 may represent the same or similar element 140 as shown in and described with respect to FIG. 1, and vice versa. Without limiting the foregoing and unless the context requires otherwise, the sampling process 724, and the detection process of a distinctive feature 750 may represent the same or similar elements 124, and 150, respectively, as shown in and described with respect to FIG. 1, and vice versa.

Without limiting the foregoing and unless the context requires otherwise, the air flow referenced in respect to FIG. 7 may represent the same or similar air flow 120 as shown in and described with respect to FIG. 1, and vice versa. Without limiting the foregoing and unless the context requires otherwise, the detection cycle referenced in respect to FIG. 7 may represent the same or similar cycle of processes steps 950(a)/950(d) to 950(f), or the same or similar cycle of processes steps 1050(k) to 1050(j), including the iterations 1095, as shown in and described with respect to FIG. 9, and FIG. 10, respectively, and vice versa.

FIG. 8 is a schematic explanatory view illustrating an exemplary embodiment of a flow diagram for a plurality of process steps for the detection of airborne contaminants, in accordance with one or more embodiments of the present invention.

Without limiting the foregoing and unless the context requires otherwise, the flow diagram of a plurality of process steps 800 may represent, at least partially, the same or a similar plurality of process steps as described in respect to FIG. 1, FIG. 2, FIG. 3, and FIG. 7, including, but not limited to, the sampling process 124, 324, and 724, respectively, and the detection process of a distinctive feature 150, 250, and 750, respectively, and vice versa.

In one or more exemplary embodiments of the present invention, the process step 850(a) of sampling a plurality of airborne particulate matter from an air flow to thereby obtain a specimen of coherent or condensed matter, the process step 850(b) of detecting at least one distinctive feature of at least one non-gaseous material comprised in the specimen, and the process step 850(c) of transforming a first signal received in process step 850(b) from a sensor system into electronic data in a format for display or transmission by a communications interface, are performed sequentially as depicted in the flow diagram of FIG. 8. In another or more embodiments, each process step, for example 850(a), 850(b), and 850(c), is performed at least one time, in any order, and without an operator interaction to thereby define a hands-off, near real-time detection cycle. The process step 850(a) may be performed over a first period of time to thereby define a sampling time 885. The detection cycle may be performed over a second period of time to thereby define a cycle time 880.

Without limiting the foregoing and unless the context requires otherwise, the detection cycle referenced in respect to FIG. 8 may represent the same or similar detection cycle as described in reference to FIG. 1, FIG. 2, and FIG. 7, respectively, and vice versa. Without limiting the foregoing and unless the context requires otherwise, the cycle time 880, and the sampling time 885 may represent the same or a similar cycle time, and sampling time, respectively, as described in respect to FIG. 1, FIG. 2, and FIG. 7, respectively, and vice versa. Without limiting the foregoing and unless the context requires otherwise, the process step 850(a), the process step 850(b), and the process step 850(c) may represent the same or similar process steps (a), (b), and (c), respectively, as described in respect to FIG. 1, FIG. 2, and FIG. 7, respectively, and vice versa.

Without limiting the foregoing and unless the context requires otherwise, the plurality of airborne particulate matter referenced in respect to FIG. 8 may represent the same or similar element 121 as shown in and described with respect to FIG. 1, and vice versa. Without limiting the foregoing and unless the context requires otherwise, the specimen, the coherent or condensed matter, the distinctive feature, the non-gaseous material, the sensor system, and the communications interface referenced in respect to FIG. 8 may represent the same or similar elements 130, 131, 150, 132, 162, and 185, respectively, as shown in and described with respect to FIG. 1, and vice versa. Without limiting the foregoing and unless the context requires otherwise, the air flow referenced in respect to FIG. 8 may represent the same or similar air flow 120 as shown in and described with respect to FIG. 1, and vice versa. Without limiting the foregoing and unless the context requires otherwise, the first signal referenced in respect to FIG. 8 may represent the same or similar first signal 165 as shown in and described with respect to FIG. 1, and vice versa. Without limiting the foregoing and unless the context requires otherwise, the electronic data referenced in respect to FIG. 8 may represent the same or similar electronic data 180 as shown in and described with respect to FIG. 1, and vice versa.

FIG. 9 is a schematic explanatory view illustrating another exemplary embodiment of a flow diagram for a plurality of process steps for the detection of airborne contaminants, in accordance with one or more embodiments of the present invention.

Without limiting the foregoing and unless the context requires otherwise, the flow diagram of a plurality of process steps 900 may represent, at least partially, the same or a similar plurality of process steps as described in respect to FIG. 1, FIG. 2, FIG. 3, FIG. 6, and FIG. 7 including, but not limited to, the sampling process 124, 324, and 724, respectively, the detection process of a distinctive feature 150, 250, and 750, respectively, the process of annihilating or evaporating at least partially the specimen 680, and the process of recycling the substrate 770, and vice versa.

In one or more exemplary embodiments of the present invention, the process step 950(*a*) of sampling a plurality of airborne particulate matter from an air flow to thereby obtain a specimen of coherent or condensed matter adjacent a substrate, the process step 950(*b*) of detecting at least one distinctive feature of at least one non-gaseous material comprised in the specimen, the process step 950(*c*) of transforming a first signal received in process step 950(*b*) from a sensor system into electronic data in a format for display or transmission by a communications interface, the process step 950(*d*) of counting particles, the process step 950(*e*) of annihilating or evaporating at least partially the specimen, and the process step 950(*f*) of recycling the substrate are performed in the order as depicted in the flow diagram of FIG. 9. In another or more embodiments, each process step, for example 950(*a*), 950(*b*), 950(*c*), 950(*d*), 950(*e*), and 950(*f*), is performed at least one time, in any order, and without an operator interaction to thereby define a hands-off, near real-time detection cycle. The process step 950(*a*) may be performed over a first period of time to thereby define a sampling time 985. In one embodiment, a second signal derived from process step 950(*d*) of counting particles is processed to determine the sample time 985. The detection cycle may be performed over a second period of time to thereby define a cycle time 980. In yet another embodiment, at the end of each detection cycle, the process is started over again 990 for a plurality of detection cycles. In one embodiment the total time period for a plurality of detection cycles to operate the system 100, 200, and/or 700, as described with respect to FIG. 1, FIG. 2, and FIG. 7, respectively, without an operator interaction may range from 1 day to 1 year. In another embodiment, that total time period is approximately 3 months.

In yet another exemplary embodiment of the present invention, the second signal derived from process step 950(*d*) of counting particles is processed to determine the sample time 985 so that when a predetermined particle count is reached, for example 1000 particles, the sample time 985 is terminated. This may result in a situation that the detection data resulting from a certain detection cycle can be compared to detection data resulting from a different detection cycle, each detection cycle with a sample time 985 that may vary but based on the same or similar particle count. The sample time 985 may be correlated to the volumetric air flow, and to the particle count to calculate a concentration of a certain particulate contaminant, for example a biologic material, for example in particles per cubic meters of environmental air.

Without limiting the foregoing and unless the context requires otherwise, the detection cycle referenced in respect to FIG. 9 may represent the same or similar detection cycle as described in reference to FIG. 1, and vice versa. Without limiting the foregoing and unless the context requires otherwise, the cycle time 980, and the sampling time 985 may represent the same or a similar cycle time, and sampling time, respectively, as described in respect to FIG. 1, and vice versa. Without limiting the foregoing and unless the context requires otherwise, the process step 950(*a*), the process step 950(*b*), the process step 950(*c*), the process step 950(*d*), the process step 950(*e*), and the process step 950(*f*) may represent the same or similar process steps (a), (b), (c), (d), (e), and (f), respectively, as described in respect to FIG. 1, and vice versa.

Without limiting the foregoing and unless the context requires otherwise, the plurality of airborne particulate matter referenced in respect to FIG. 9 may represent the same or similar element 121 as shown in and described with respect to FIG. 1, and vice versa. Without limiting the foregoing and unless the context requires otherwise, the substrate, the specimen, the coherent or condensed matter, the distinctive feature, the non-gaseous material, the biologic material, the sensor system, and the communications interface referenced in respect to FIG. 9 may represent the same or similar elements 140, 130, 131, 150, 132, 133, 162, and 185, respectively, as shown in and described with respect to FIG. 1, and vice versa. Without limiting the foregoing and unless the context requires otherwise, the air flow referenced in respect to FIG. 9 may represent the same or similar air flow 120 as shown in and described with respect to FIG. 1, and vice versa. Without limiting the foregoing and unless the context requires otherwise, the first signal referenced in respect to FIG. 9 may represent the same or similar first signal 165 as shown in and described with respect to FIG. 1, and vice versa. Without limiting the foregoing and unless the context requires otherwise, the second signal referenced in respect to FIG. 9 may represent the same or similar second signal as described in respect to FIG. 1, and vice versa. Without limiting the foregoing and unless the context requires otherwise, the electronic data referenced in respect to FIG. 9 may represent the same or similar electronic data 180 as shown in and described with respect to FIG. 1, and vice versa.

FIG. 10 is a schematic explanatory view illustrating yet another exemplary embodiment of a flow diagram for a plurality of process steps for the detection of airborne contaminants, in accordance with one or more embodiments of the present invention.

Without limiting the foregoing and unless the context requires otherwise, the flow diagram of a plurality of process steps 1000 may represent, at least partially, the same or a similar plurality of process steps as described in respect to FIG. 1, FIG. 2, FIG. 3, FIG. 4, FIG. 5, FIG. 6, and FIG. 7 including, but not limited to, the process of nanoscale particle generation and disbursement 480, to process of mixing process particles in an air flow 580, the sampling process 124, 324, and 724, respectively, the detection process of a distinctive feature 150, 250, and 750, respectively, in a form of a process, where a source 264 emits a first electromagnetic radiation 252, and where a sensor system 262 receives a second electromagnetic radiation 255, the process of annihilating or evaporating at least partially the specimen 680, and the process of recycling the substrate 770, and vice versa.

In one or more exemplary embodiments of the present invention, the process step 1050(*a*) of sampling a plurality of airborne particulate matter from an air flow to thereby obtain a specimen of coherent or condensed matter adjacent the substrate, the process step 1050(*g*) of generating solid nanoscale particles and mixing the solid particles with the air flow, the process step 1050(*h*-1) of emitting a first electromagnetic radiation to excite or breakdown a third plurality of molecules comprised in the substrate, the process step 1050(*h*-2) of emitting a first electromagnetic radiation to excite or breakdown a first plurality of molecules comprised in the specimen, the process step 1050(*i*-1) of detecting a second electromagnetic radiation of scatter emitted by a fourth plurality of molecules comprised in the substrate, the process steps 1050(*i*-2), and 1050(*i*-*n*) of detecting a second electromagnetic radiation of scatter emitted by a second plurality of molecules comprised in the specimen, the process step 1050(*j*) of computing data derived from first signals received from the detection process steps 1050(*i*-1), 1050(*i*-2) and 1050(*i*-*n*) above, and the process step 1050(*k*) of initially placing and then replacing a substrate are performed in the order as depicted in the flow diagram of FIG. 10. In another or more embodiments, each process step, for example 1050(*a*), 1050(*g*), 1050(*h*-1), 1050(*h*-2), 1050(*i*-1), 1050(*i*-2), 1050(*i*-*n*), 1050(*j*), and 1050(*k*), is performed at least one time, in any order, and without an operator interaction to thereby define a hands-off, near real-time detection cycle. The process step 1050(*a*) may be performed over a first period of time to thereby define a sampling time 1085. The process step 1050(*i*-*n*) may be performed more than one time over a total of a third period of time to thereby define a lifetime 1087. In one embodiment, a first signal derived from process step 1050(*i*-*n*) of detecting a second electromagnetic radiation of scatter emitted by a second plurality of molecules comprised in the specimen is, for example, processed to determine number of cycles 1095 performing process step 1050(*i*-*n*), so that, for example another iteration 1095 of process step 1050(*i*-*n*) is performed if the detection data representing the intensity of a second electromagnetic radiation derived from the last iteration are greater than 10% of the detection data representing the intensity of a second electromagnetic radiation derived from the process step 1050(*i*-2). In this case, for example, the number of iterations 1095 and the time 1087 between the end of process step 1050(*h*-2), $t_{lifetime1}$ and the end of the last iteration of process step 1050(*i*-*n*), $t_{lifetime2}$ may represent a lifetime of scatter 1087, after first electromagnetic radiation is turned off. The profile of decreasing detection data of the iteratively performed process step 1050(*i*-*n*) may correlate to a certain amount or a type of contamination in the non-gaseous material, or the biologic material comprised in the specimen adjacent the substrate. The overall detection cycle may be performed over a period of time to thereby define a cycle time 1080. In yet another embodiment, at the end of each detection cycle, the process is started over again 1090 for a plurality of detection cycles.

In yet another exemplary embodiment of the present invention, the process step 1050(*j*) of computing data derived from first signals received from the detection process steps 1050(*i*-1), 1050(*i*-2) and 1050(*i*-*n*), may comprise one or more of the following process steps: calibrating a first spectral information based on a second spectral information, attuning the spectral spread of a signal, attuning an intensity of a signal, attuning the polarization of a signal, and/or the like. In one embodiment, the data derived from first signals received from the detection process steps 1050(*i*-1) would be taken, for example, as a baseline, while the data derived from first signals received from the detection process steps 1050(*i*-2) would be computed as a difference over the baseline to eliminate the effect of the substrate on the detection, and to bring emphasis to, amplify the impact of, or improve the signal-to-noise-ratio with respect to the non-gaseous material comprised in the specimen in the detection data. In another embodiment, the process step 1050(*j*) may further comprise a process step of determining a parameter related to at least one of the following: particle shape, size, refractive index, polarization, absorption, molecular structures, molecular composition, biological and microbial content, chemical reactions, and/or the like.

Without limiting the foregoing and unless the context requires otherwise, the detection cycle referenced in respect to FIG. 10 may represent the same or similar detection cycle as described in reference to FIG. 1, and vice versa. Without limiting the foregoing and unless the context requires otherwise, the cycle time 1080, and the sampling time 1085 may represent the same or a similar cycle time, and sampling time, respectively, as described in respect to FIG. 1, and vice versa.

Without limiting the foregoing and unless the context requires otherwise, the process step 1050(*a*) may represent the same or similar process step (a) as described in respect to FIG. 1, and vice versa. Without limiting the foregoing and unless the context requires otherwise, the process step 1050(*g*) may represent the same or similar process element 480 as described in respect to FIG. 4, and vice versa. Without limiting the foregoing and unless the context requires otherwise, the process step 1050(*k*) may represent the same or similar process step (f) as described in respect to FIG. 1, and vice versa. Without limiting the foregoing and unless the context requires otherwise, the process step 1050(*h*-1) in combination with process step 1050(*i*-1), the process step 1050(*h*-2) in combination with process step 1050(*i*-2), and the process step 1050(*i*-*n*), may, each, represent the same or similar process step (b) as described in respect to FIG. 1, and vice versa.

Without limiting the foregoing and unless the context requires otherwise, the plurality of airborne particulate matter referenced in respect to FIG. 10 may represent the same or similar element 121 as shown in and described with respect to FIG. 1, and vice versa. Without limiting the foregoing and unless the context requires otherwise, the substrate, the specimen, the coherent or condensed matter, the non-gaseous material, the biologic material, the sensor system, and the communications interface referenced in respect to FIG. 10 may represent the same or similar elements 140, 130, 131, 132, 133, 162, and 185, respectively, as shown in and described with respect to FIG. 1, and vice versa. Without limiting the foregoing and unless the context requires otherwise, the air flow referenced in respect to FIG. 10 may represent the same or similar air flow 120 as shown in and described with respect to FIG. 1, and vice versa. Without limiting the foregoing and unless the context requires otherwise, the first signal referenced in respect to FIG. 10 may represent the same or similar first signal 165 as shown in and described with respect to FIG. 1, and vice versa. Without limiting the foregoing and unless the context requires otherwise, the various data referenced in respect to FIG. 10 may represent the same or similar electronic data 180 as shown in and described with respect to FIG. 1, and vice versa.

In one and more exemplary embodiments of the present invention, the systems 100, 200, and/or 700, and/or the subsystems 300, 400, 600, and/or the process 500, as shown in FIG. 1, FIG. 2, and FIG. 7, respectively, and in FIG. 3, FIG. 4, FIG. 6, and FIG. 5, respectively, may be combined in any combination and configured to perform a method for the detection of airborne contaminants, the method comprising the steps: (a) sampling a plurality of airborne particulate matter (e.g. 121, 321, and/or 521); for example, by filtering, impinging, precipitation) from an air flow (e.g. 120, and/or 420), to thereby obtain a specimen (e.g. 130, 230, 330, 630, and/or 730) of coherent or condensed matter (e.g. 131, 231, 331, and/or 631) over a first period of time to thereby define a sampling time (e.g. 885, 985, and/or 1085); (b) detecting at least one non-gaseous material (e.g. 132, 232, 332, and/or 632), comprised in the specimen (e.g. 130, 230, 330, 630, and/or 730); (c) receiving a first signal (e.g. 165), from a sensor system (e.g. 162, 262, and/or 761) employed in step (b); and (d) transforming the first signal (e.g. 165) into electronic data (e.g. 180) in a format for display or transmission by a communications interface (e.g. 185). In another exemplary embodiment of the present invention a method for the detection of airborne contaminants comprises the steps (a), (b), (c), and (d). In yet another embodiment, the steps (a), (b), (c), and (d) being performed at least partially sequential, in any order, each step is performed at least one time, and without an operator interaction to thereby define a hands-off, near real-time detection cycle. The detection cycle may be performed over a second period of time to thereby define a cycle time (e.g. 880, 980, and/or 1080). In one embodiment, the step (a) is performed without adding a liquid for sampling. In another embodiment, the step (a) is performed with adding a liquid for sampling. In one embodiment, the step (b) is performed without adding a liquid for detection. In another embodiment, the step (b) is performed with adding a liquid for detection. In one embodiment, the step (b) utilizes an excitement process of a plasmon resonance of at least a portion of the coherent or condensed matter (e.g. 131, 231, 331, and/or 631) and further utilizes a detection process (e.g. 150, 250, and/or 750) of an enhanced plasmon resonance of at least a portion of the coherent or condensed matter (e.g. 131, 231, 331, and/or 631). In another embodiment, the cycle time (e.g. 880, 980, and/or 1080) does not exceed 1 hour.

In one and more exemplary embodiments of the present invention, the systems 100, 200, and/or 700, and/or the subsystems 300, 400, 600, and/or the process 500, as shown in FIG. 1, FIG. 2, and FIG. 7, respectively, and in FIG. 3, FIG. 4, FIG. 6, and FIG. 5, respectively, may be combined, in any combination, and configured to perform a method for the detection of airborne contaminants, the method comprising the method steps (a), (b), (c), and (d), as referenced in the preceding paragraph, in combination with one or more of the following method steps: (e1) generating the air flow (e.g. 120, and/or 420), (e2) employing a cyclonic separation process configured to sort particles, (e3) counting airborne particles in the air flow (e.g. 120, and/or 420), (e4) determining the sampling time (e.g. 885, 985, and/or 1085) responsive to a second signal derived from a step counting particles, (e5) exposing the specimen (e.g. 130, 230, 330, 630, and/or 730) to a nanoscale surface structure (e.g. 141, and/or 241) to thereby enhance a plasmon resonance, (e6) exposing the specimen (e.g. 130, 230, 330, 630, and/or 730) to solid nanoscale particles (e.g. 134, 234, 334, and/or 634) to thereby enhance a plasmon resonance, (e7) exposing the specimen (e.g. 130, 230, 330, 630, and/or 730) to colloids to thereby enhance a plasmon resonance, (e8) exposing the specimen (e.g. 130, 230, 330, 630, and/or 730) to an electromagnetic radiation (e.g. 252) to thereby detect the non-gaseous material (e.g. 132, 232, 332, and/or 632), (e9) exposing the specimen (e.g. 130, 230, 330, 630, and/or 730) to an electrostatic field to thereby detect the non-gaseous material (e.g. 132, 232, 332, and/or 632), (e10) exposing the specimen (e.g. 130, 230, 330, 630, and/or 730) to a magnetic field to thereby detect the non-gaseous material (e.g. 132, 232, 332, and/or 632), (e11) detecting an electromagnetic scatter (e.g. 255, 256, and/or 257) emitted by at least one molecule (e.g. 236) comprised in the specimen (e.g. 130, 230, 330, 630, and/or 730), (e12) detecting a magnetic or electromagnetic resonance of at least portions of the specimen (e.g. 130, 230, 330, 630, and/or 730), (e13) detecting a cavity ring-down laser absorption spectrum, (e14) calibrating a detection system (e.g. 160, 260, and/or 760), (e15) calibrating a sensor system (e.g. 162, 262, and/or 761), (e16) cooling a sensor system (e.g. 162, 262, and/or 761), (e17) heating the specimen (e.g. 130, 230, 330, 630, and/or 730), (e18) exposing the specimen (e.g. 130, 230, 330, 630, and/or 730) to a vacuum, (e19) evaporating at least portions of the specimen (e.g. 130, 230, 330, 630, and/or 730), (e20) annihilating at least portions of the specimen (e.g. 130, 230, 330, 630, and/or 730), (f1) filtering an air volume, (f2) recycling a substrate (e.g. 140, 240, 340, 640, and/or 740), (f3) replacing a substrate (e.g. 140, 240, 340, 640, and/or 740), (f4) providing a plurality of the substrate (e.g. 140, 240, 340, and/or 640) from a coil, (f5) winding up a plurality of the substrate (e.g. 140, 240, 340, and/or 640) to form a coil, (f6) replacing a coil comprising a plurality of the substrate (e.g. 140, 240, 340, and/or 640), (f7) discarding a coil comprising a plurality of the substrate (e.g. 140, 240, 340, and/or 640), (f8) cleaning the substrate (e.g. 140, 240, 340, 640, and/or 740), (f9) recycling the substrate (e.g. 140, 240, 340, 640, and/or 740) and utilizing the recycled substrate (e.g. 140, 240, 340, 640, and/or 740) performing a plurality of the detection cycle, (f10) recycling the substrate (e.g. 140, 240, 340, 640, and/or 740) utilizing a rotary indexing table (e.g. 790), and/or the like, performed at least partially sequential, in any order, in any combination, each step is performed at least one time, and without an operator interaction to thereby define a hands-off, near real-time detection cycle. The detection cycle may be performed over a second period of time to thereby define a cycle time (e.g. 880, 980, and/or 1080).

In yet another exemplary embodiment of the present invention, the method step (b), as referenced above, comprises the step (b1) sensing at least one phenomenon of physics. The phenomenon of physics may comprise one or more of the following: an image, a microscopic image, an absorption spectrum, an emission spectrum, an information of a particle size, an information of a particle shape, a Raman scattering, a Rayleigh scattering, a Mie scattering, a Tyndall scattering, a mass spectrum or histogram, a nuclear magnetic resonance spectrum, a cavity ring-down laser absorption spectrum, a laser-induced breakdown emission, a spark-induced breakdown emission, a thermal emission, an intrinsic photoluminescence, a photoluminescence of a marker reagent, a chromogenic effect, a rovibrational transition of molecules in the infrared spectrum, a plasmon resonance, an enhanced plasmon resonance, a fluorescence lifetime, a multiphoton excited fluorescence, an emission anisotropy, a change in polarization, and/or the like.

In yet another exemplary embodiment of the present invention, the method step (d), as referenced above, may comprise the step (d1) processing the electronic data (e.g. 180), the processing comprising at least one of the following numerical methods: descriptive statistics, Fourier analysis, correlation, dependence, inferential statistics, regression analysis, probability theory, data mining, and/or the like; and may further comprise the step (d2) providing information comprising an identification and/or an amount of at least one biologic contaminant (e.g. 133, 233, 333, and/or 633). The information comprising an identification and/or an amount of at least one biologic contaminant (e.g. 133, 233, 333, and/or 633) may be made accessible to public health authorities for risk management and/or to private individuals to be informed about the amount of airborne bioburden in a certain indoor environment.

In yet another exemplary embodiment of the present invention, a system 100, 200, or 700, as shown in FIG. 1, FIG. 2, and FIG. 7, respectively, is configured to carry out one or more method or process steps listed in the preceding paragraphs, in no or in any order, said system(s) comprising one or more of the features listed in the preceding paragraphs.

All the aforementioned embodiments, objects, configurations, features, and steps disclosed herein are deemed to be disclosed alone or in any combination, in the disclosed or in reverse order, or no or in any order as a person skilled in the art would combine and/or order the embodiments, objects, configurations, features and steps disclosed herein.

All the aforementioned listed objects, configurations, features, and steps disclosed herein are deemed to include like elements as a person skilled in the art would add elements to those lists.

One of ordinary skill in the art should understand that the various aspects of the present invention, as explained above, can readily be combined with each other.

The words used in this specification to describe the various exemplary embodiments of the present invention are to be understood not only in the sense of their commonly defined meanings, but to include by special definition in this specification structure, material, or acts beyond the scope of the commonly defined meanings. Thus, if an element can be understood in the context of this specification as including more than one meaning, then its use in a claim must be understood as being generic to all possible meanings supported by the specification and by the word, itself.

Whenever the context requires, all words used in the singular number shall be deemed to include the plural and vice versa. Words which import one gender shall be applied to any gender wherever appropriate. Whenever the context requires, all options that are listed with the word "and" shall be deemed to include the world "or" and vice versa, and any combination thereof. If applicable, the words "vice versa" shall be deemed to include the words "in each case, unless the context requires otherwise". The titles of the sections of this specification and the sectioning of the text in separated paragraphs are for convenience of reference only and are not to be considered in construing this specification.

If a first element is referenced being the same or similar to a second element, and vice versa, and the second element is referenced being the same or similar to a third element, and vice versa, then it shall be deemed that the first element is the same or similar to the third element, and vice versa.

Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements.

In the drawings and specification, there have been disclosed embodiments of the present invention, and although specific terms are employed, the terms are used in a descriptive sense only and not for purposes of limitation, the scope of the invention being set forth in the following claims, when attached. The invention has been described in considerable detail with specific reference to the illustrated embodiments. It will be apparent, however, that various modifications and changes can be made within the spirit and scope of the invention as described in the foregoing specification.

In various implementations, described process(es) may be implemented by various described system(s), such as systems 100, 200, and/700, or subsystems 300, 400, and/or 600. In addition, various described operation(s) may be added, deleted, and/or modified in implementations of the described process(es) and/or system(s). In some implementations, a described process or operations thereof may be performed in combination with other described process(es) or operations thereof.

It is to be understood the implementations are not limited to particular systems or processes described which may, of course, vary. It is also to be understood that the terminology used herein is for the purpose of describing particular implementations only and is not intended to be limiting. As used in this specification, the singular forms "a", "an" and "the" include plural referents unless the content clearly indicates otherwise. Thus, for example, reference to "a material" includes a combination of two or more materials and reference to "a laser" includes different types and/or combinations of lasers.

Although the present disclosure has been described in detail, it should be understood that various changes, substitutions, and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

INDUSTRIAL APPLICABILITY

All embodiments of this disclosure can be applied to an apparatus for the detection of airborne bioburden.

REFERENCE SIGNS LIST

100 system, 110 first assembly, 111 particle counter, 112 first supply unit, 113 second supply unit, 115 (electrostatic) precipitator, 116 plasma cleaning unit, 117 handling unit, 120 air flow (e.g. intake), 121 airborne particulate matter, 122 airborne nanoscale particles, 124 sampling process, 126 air flow (e.g. exhaust), 130 specimen, 131 coherent or condensed matter, 132 non-gaseous material, 133 biologic material, 134 nanoscale particles, 140 substrate, 141 enhancement structure, 150 (detection process of) distinctive feature, 160 second assembly, 162 sensor system, 165 (transfer of) first signal, 170 control unit, 172 processor, 174 non-transitory storage medium, 175 electronic converter, 180 (transfer of) electronic data, 185 communications interface, 190 cloud data storage and computing system, 195 desktop personal computer, 200 system (truncated), 210 first assembly (truncated), 230 specimen, 231 coherent or condensed matter, 232 non-gaseous material, 233 biologic material, 234 nanoscale particles, 235 first plurality of molecules, 236 second plurality of molecules, 240 substrate, 241 enhancement structure, 250 (detection process of) distinctive feature, 252 first electromagnetic radiation, 255 second electromagnetic radiation, 256 first band of wavelength of second electromagnetic radiation, 257 second band of wavelength of second electromagnetic radiation, 260 second assembly, 262 sensor system, 264 source, 266 optical beam shaping assembly, 272 optical collection assembly, 274 optical element (e.g. prism, diffraction lens, diffraction grating), 276 receiving optical system (e.g. CCD line chip), 300 sampling process, 315 electrostatic precipitator, 321 airborne particulate matter, 322 airborne nanoscale particles, 324 sampling process by electrostatic forces, 330 specimen, 331 coherent or condensed matter, 332 non-gaseous material, 333 biologic material, 334 nanoscale particles, 340 substrate (e.g. grounded), 390 electrode (e.g. negatively charged, high voltage), 395 lines of electric flux (schematic), 400 particle generation process, 412 first supply unit, 413 second supply unit, 420 air flow, 422 airborne nanoscale particles, 480 process of sputter particle generation and disbursement, 490 ignition system, 491 power supply, 492 electrode (e.g. grounded), 494 electrode (e.g. high voltage to ignite, e.g. heated), 495 lines of electric flux (schematic), 496 spark discharge (schematic), 500 process of mixing particles, 521 airborne particulate matter, 522 airborne nanoscale particles, 580 process of mixing particles in an air flow, 585 airborne mix of particles, 600 plasma etching process, 616 plasma cleaning unit, 630 specimen, 631 coherent or condensed matter, 632 non-gaseous material, 633 biologic material, 634 nano particles, 640 substrate (e.g. grounded), 680 process of plasma etching, 690 electrode (e.g. high voltage), 695 lines of electric flux (schematic), 696 plasma discharge (schematic), 697 gaseous and non-gaseous exhaust, 700 system (truncated), 710 first assembly (truncated), 715 precipitator (truncated), 715-x components of precipitator, 716 plasma cleaning unit (truncated), 716-x components of plasma cleaning unit, 717 handling unit, 724 sampling process, 730 plurality of specimen, 740 plurality of substrates, 750 (detection process of) distinctive feature, 760 second assembly (truncated), 761 components of second assembly (e.g. source, sensor system), 770 handling process of positioning and replacing substrates, 775 indexed rotary movement, 780 process of plasma etching, 790 rotary indexing table, 800 flow diagram of a plurality of process steps, 850(*a*) process step of sampling a plurality of airborne particulate matter from an air flow to thereby obtain a specimen of coherent or condensed matter, 850(*b*) process step of detecting at least one distinctive feature of at least one non-gaseous material comprised in the specimen, 850(*c*) process step of transforming a first signal received in process step 850(*b*) from a sensor system into electronic data in a format for display or transmission by a communications interface, 880 indication of cycle time, 885 indication of sampling time, 900 flow diagram of a plurality of process steps, 950(*a*) process step of sampling a plurality of airborne particulate matter from an air flow to thereby obtain a specimen of coherent or condensed matter adjacent a substrate, 950(*b*) process step of detecting at least one distinctive feature of at least one non-gaseous material comprised in the specimen, 950(*c*) process step of transforming a first signal received in process step 950(*b*) from a sensor system into electronic data in a format for display or transmission by a communications interface, 950(*d*) process step of counting particles, 950(*e*) process step of annihilating or evaporating at least partially the specimen, 950(*f*) process step of recycling the substrate, 980 indication of cycle time, 985 indication of sampling time, 990 indication of reentering the process flow of a detection cycle of process steps 950(*a*)/950(*d*)-950(*f*), 1000 flow diagram of a plurality of process steps, 1050(*a*) process step of sampling a plurality of airborne particulate matter from an air flow to thereby obtain a specimen of coherent or condensed matter adjacent the substrate, 1050(*g*) process step of generating solid nanoscale particles and mixing the solid particles with the air flow, 1050(*h*-1) process step of emitting a first electromagnetic radiation to excite or breakdown a third plurality of molecules comprised in the substrate, 1050(*h*-2) process step of emitting a first electromagnetic radiation to excite or breakdown a first plurality of molecules comprised in the specimen, 1050(*i*-1) process step of detecting a second electromagnetic radiation of scatter emitted by a fourth plurality of molecules comprised in the substrate, 1050(*i*-2)/1050(*i*-*n*) process step of detecting a second electromagnetic radiation of scatter emitted by a second plurality of molecules comprised in the specimen, 1050(*j*) process step of computing data derived from signals received from the detection process steps 1050(*i*-1), 1050(*i*-2) and 1050(*i*-*n*) above, 1050(*k*) process step of initially placing and then replacing a substrate, 1080 indication of cycle time, 1085 indication of sampling time, 1087 indication of a scatter lifetime, 1090 indication of reentering the process flow of a detection cycle of process steps 1050(*k*)-1050(*j*), 1095 indication of iteratively performing the process step 1050(*i*-*n*).

What is claimed:

1. A detection system comprising:
   an intake and an exhaust for an air flow;
   a first assembly including an enclosure adjacent the intake and the exhaust, the first assembly further including a substrate; the first assembly operational to generate and direct the air flow adjacent the substrate;
   a collected bulk of condensed matter adhering to the substrate;
   a spectroscopic optical sensor system directed to the collected bulk of condensed matter adhering to the substrate, the spectroscopic optical sensor system operational to detect in near real-time at least one distinctive feature of the collected bulk of condensed matter adhering to the substrate, wherein the spectroscopic optical sensor system is further configured to sense at least one phenomenon of physics selected from the group consisting of: an emission spectrum and an emission anisotropy;
   an electronic converter operational to transform a first signal received from the spectroscopic optical sensor system representative of the at least one distinctive feature into electronic data in a format for display or transmission by a communications interface;
   a handling unit;
   a control unit operational to perform a plurality of process steps at least partially sequential, each process step is performed at least one time, in any order, and without an operator interaction to thereby define a hands-off, near real-time detection cycle; wherein the plurality of process steps comprising:
   (a) obtaining the collected bulk of condensed matter adhering to the substrate,
   (b) detecting the at least one distinctive feature utilizing an excitement process of a plasmon resonance of at least one portion of the collected bulk of condensed matter adhering to the substrate, and further utilizing a detection process of an enhanced plasmon resonance of at least a portion of the collected bulk of condensed matter adhering to the substrate, (c) transforming the first signal received from the spectroscopic optical sensor system into the electronic data, and (d) replacing or recycling the substrate via the handling unit configured to automate a sequential replacement or recycling of the substrate without interrupting a continuity of a plurality of near real-time detection cycles; and wherein the control unit is further operational to perform each near real-time detection cycle over a period of time to thereby define an automatic cycle time.

2. The system as recited in claim 1, wherein the control unit comprises a processor, and a non-transitory storage medium readable by the processor; the non-transitory storage medium having stored thereon a set of instructions; wherein the control unit is further configured to perform the plurality of the near real-time detection cycle sequentially without an operator interaction; and wherein the automatic cycle time does not exceed 1 hour.

3. The system as recited in claim 1,
wherein the at least one distinctive feature of the at least one non-gaseous material comprises one or more distinctive features selected from the group consisting of: an intensity of an emission band, an intensity profile of an emission spectrum, an emission lifetime, a lifetime profile of an emission spectrum, an anisotropy of an emission scatter, and an anisotropy profile of an emission spectrum; and wherein the spectroscopic optical sensor system is configured to detect the at least one distinctive feature of the at least one non-gaseous material.

4. The system as recited in claim 1, wherein the spectroscopic optical sensor system is configured to detect an electromagnetic radiation of a scatter emitted by a plurality of molecules comprised in the collected bulk of condensed matter adhering to the substrate.

5. The system as recited in claim 4, wherein the spectroscopic optical sensor system comprises at least one optical element configured to decompose the electromagnetic radiation to thereby receive at least one band of a wavelength comprised in the electromagnetic radiation or a continuum of a plurality of wavelengths comprised in the electromagnetic radiation; and wherein the spectroscopic optical sensor system utilizes at least one photoelectric effect.

6. The system as recited in claim 1, wherein the first assembly comprises a precipitator configured to utilize forces of an electrostatic or electromagnetic field to sample the collected bulk of condensed matter adhering to the substrate.

7. The system as recited in claim 1, wherein the first assembly is further configured to sample a plurality of airborne particulate matter from the air flow to thereby obtain the collected bulk of condensed matter adhering to the substrate.

8. The system as recited in claim 1, wherein the handling unit configured to replace or recycle the substrate is a rotary indexing table.

9. The system as recited in claim 1, wherein the first assembly further comprises a first supply unit configured to disburse at least one material.

10. The system as recited in claim 1, wherein the at least one non-gaseous material comprises at least one biological material including a microbial compound or a portion thereof; and wherein the spectroscopic optical sensor system is configured to detect the at least one distinctive feature of the at least one biological material.

11. The system as recited in claim 1, wherein the first assembly and the spectroscopic optical sensor system are further configured to detect the at least one distinctive feature of the at least one non-gaseous material without adding a liquid.

12. A method for the detection of airborne contaminants, the method comprising the steps:

(a) sampling particulate matter from an air flow to thereby obtain a collected bulk of condensed matter adhering to a substrate, the sampling being performed over a first period of time to thereby define a sampling time, the steps being performed at least partially sequential, in any order, each step is performed at least one time, and without an operator interaction to thereby define a hands-off, near real-time detection cycle;

(b) detecting at least one non-gaseous material comprised in the collected bulk of condensed matter adhering to a substrate, the detecting includes sensing at least one phenomenon of physics selected from the group consisting of: an emission spectrum, and an emission anisotropy;

(c) receiving a first signal from a spectroscopic optical sensor system employed in step (b); and (d) transforming the first signal into electronic data in a format for display or transmission by a communications interface;

(e) replacing or recycling the substrate via a handling unit configured to automate a sequential replacement or recycling of the substrate without interrupting a continuity of a plurality of the near real-time detection cycles; and the detection cycle being performed over a second period of time to thereby define a cycle time; and wherein step (b) utilizes an excitement process of a plasmon resonance of at least a portion of the collected bulk of condensed matter adhering to the substrate, and further utilizes a detection process of an enhanced plasmon resonance of at least a portion of the collected bulk of condensed matter adhering to the substrate; and wherein the cycle time does not exceed 1 hour.

13. The method as recited in claim 12, wherein step (a) is performed without adding a liquid for sampling; and wherein step (b) is performed without adding a liquid for detection.

14. The method as recited in claim 12, wherein the handling unit is a rotary indexing table.

15. A detection system comprising:
an intake and an exhaust for an air flow;
a first assembly including an enclosure adjacent the intake and the exhaust, the first assembly further including a substrate; the first assembly operational to generate and direct the air flow adjacent the substrate;
a collected bulk of condensed matter adhering to the substrate;
a spectroscopic optical sensor system directed to the collected bulk of condensed matter adhering to the substrate, the spectroscopic optical sensor system operational to detect in near real-time at least one distinctive feature of the collected bulk of condensed matter adhering to the substrate, wherein the detecting the at least one distinctive feature utilizing a detection process of a Raman scattering or of an enhanced Raman scattering, wherein the spectroscopic optical sensor system is further configured to sense at least one phenomenon of physics selected from the group consisting of: an emission spectrum and an emission anisotropy;

an electronic converter operational to transform a first signal received from the spectroscopic optical sensor system representative of the at least one distinctive feature into electronic data in a format for display or transmission by a communications interface;

a handling unit utilizing a rotary indexing table;

a control unit operational to perform a plurality of process steps at least partially sequential, each process step is performed at least one time, in any order, and without an operator interaction to thereby define a hands-off, near real-time detection cycle; wherein the plurality of process steps comprising:

(a) obtaining the collected bulk of condensed matter adhering to the substrate, (b) detecting the at least one distinctive feature, (c) transforming the first signal received from the spectroscopic optical sensor system into the electronic data, and (d) replacing or recycling the substrate via the handling unit configured to automate a sequential replacement or recycling of the substrate without interrupting a continuity of a plurality of near real-time detection cycles; and wherein the control unit is further operational to perform each near real-time detection cycle over a period of time to thereby define an automatic cycle time.

16. The detection system of claim 15, wherein the plurality of process steps (a) and (b) are performed without adding a liquid.

17. A detection system comprising:

an intake and an exhaust for an air flow;

a first assembly including an enclosure adjacent the intake and the exhaust, the first assembly further including a substrate; the first assembly operational to generate and direct the air flow adjacent the substrate;

a collected bulk of condensed matter adhering to the substrate;

a spectroscopic optical sensor system directed to the collected bulk of condensed matter adhering to the substrate, the spectroscopic optical sensor system operational to detect in near real-time at least one distinctive feature of the collected bulk of condensed matter adhering to the substrate, wherein the detecting the at least one distinctive feature utilizing a detection process of a Raman scattering or of an enhanced Raman scattering, wherein the spectroscopic optical sensor system is further configured to sense at least one phenomenon of physics selected from the group consisting of: an emission spectrum and an emission anisotropy;

an electronic converter operational to transform a first signal received from the spectroscopic optical sensor system representative of the at least one distinctive feature into electronic data in a format for display or transmission by a communications interface;

a handling unit;

a control unit operational to perform a plurality of process steps at least partially sequential, each process step is performed at least one time, in any order, and without an operator interaction to thereby define a hands-off, near real-time detection cycle; wherein the plurality of process steps comprising:

(a) obtaining the collected bulk of condensed matter adhering to the substrate, (b) detecting the at least one distinctive feature, (c) transforming the first signal received from the spectroscopic optical sensor system into the electronic data, and (d) replacing the substrate via the handling unit configured to automate a sequential replacement of the substrate without interrupting a continuity of a plurality of near real-time detection cycles; and wherein the control unit is further operational to perform each near real-time detection cycle over a period of time to thereby define an automatic cycle time.

18. The detection system of claim 17, wherein the plurality of process steps (a) and (b) are performed without adding a liquid.

* * * * *